US012272312B2

(12) United States Patent
Lee et al.

(10) Patent No.: US 12,272,312 B2

(45) Date of Patent: Apr. 8, 2025

(54) PIXEL, A DISPLAY DEVICE AND AN OPERATING METHOD OF THE PIXEL

(71) Applicant: Samsung Display Co., Ltd., Yongin-Si (KR)

(72) Inventors: Wonjun Lee, Yongin-si (KR); Cholho Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/200,692

(22) Filed: May 23, 2023

(65) Prior Publication Data

US 2024/0071310 A1 Feb. 29, 2024

(30) Foreign Application Priority Data

Aug. 26, 2022 (KR) ........................ 10-2022-0107891

(51) Int. Cl.

*G09G 3/3258* (2016.01)

*G09G 3/3291* (2016.01)

(52) U.S. Cl.

CPC ......... *G09G 3/3258* (2013.01); *G09G 3/3291* (2013.01)

(58) Field of Classification Search

CPC ............... G09G 3/3291; G09G 3/3258; G09G 2320/045

See application file for complete search history.

(56) References Cited

U.S. PATENT DOCUMENTS

| | | | | |
|---|---|---|---|---|
| 6,753,655 B2 * | 6/2004 | Shih | ..................... | G09G 3/3241 345/82 |
| 7,911,423 B2 * | 3/2011 | Kim | ..................... | G09G 3/3241 345/76 |

(Continued)

FOREIGN PATENT DOCUMENTS

| | | |
|---|---|---|
| KR | 10-1351416 | 1/2014 |
| KR | 10-2020-0143623 | 12/2020 |

(Continued)

OTHER PUBLICATIONS

Ya-Hsiang Tai, et al., "Three-Transistor AMOLED Pixel Circuit With Threshold Voltage Compensation Function Using Dual-Gate IGZO TFT", IEEE Electron Device Letters, vol. 33, No. 3, Mar. 2012, pp. 393-395.

*Primary Examiner* — William Boddie

*Assistant Examiner* — Bipin Gyawali

(74) *Attorney, Agent, or Firm* — F. CHAU & ASSOCIATES, LLC

(57) ABSTRACT

A pixel including: a light emitting element; a first transistor including a first electrode, a second electrode electrically connected to the light emitting element, a gate electrode, and a body electrode; a second transistor connected between a first driving voltage line for receiving a first driving voltage and the first electrode of the first transistor and including a gate electrode for receiving a first emission control signal; a first circuit which provides a reference voltage to the gate electrode of the first transistor in response to a first scan signal and a second scan signal; and a second circuit which provides an initialization voltage to the body electrode of the first transistor in response to the first scan signal, the second scan signal, and a second emission control signal.

18 Claims, 21 Drawing Sheets

(56) References Cited

U.S. PATENT DOCUMENTS

| | | | | |
|---|---|---|---|---|
| 8,866,705 | B2 | 10/2014 | Takasugi et al. | |
| 10,916,197 | B1 * | 2/2021 | Zhang | G09G 3/3258 |
| 11,049,929 | B2 | 6/2021 | Jeon et al. | |
| 11,158,261 | B2 | 10/2021 | Kim et al. | |
| 11,222,603 | B2 | 1/2022 | Cho et al. | |
| 2009/0219234 | A1 * | 9/2009 | Yamamoto | H05B 44/00 345/80 |
| 2012/0019501 | A1 * | 1/2012 | Choi | H10K 59/1216 345/76 |
| 2015/0138253 | A1 * | 5/2015 | Kimura | G09G 3/3283 345/77 |
| 2016/0042694 | A1 * | 2/2016 | Lim | G09G 3/3233 345/78 |
| 2017/0148384 | A1 * | 5/2017 | Lee | G09G 3/3233 |
| 2019/0362674 | A1 * | 11/2019 | Xu | G09G 3/3241 |
| 2020/0013338 | A1 * | 1/2020 | Kang | G09G 3/3233 |
| 2021/0049958 | A1 * | 2/2021 | Kim | G09G 3/325 |
| 2022/0101789 | A1 * | 3/2022 | Dong | G09G 3/3291 |

FOREIGN PATENT DOCUMENTS

| | | |
|---|---|---|
| KR | 10-2021-0013488 | 2/2021 |
| KR | 10-2021-0019639 | 2/2021 |

* cited by examiner

PIXEL, A DISPLAY DEVICE AND AN OPERATING METHOD OF THE PIXEL

CROSS-REFERENCE TO RELATED APPLICATION

This application claims priority under 35 U.S.C. § 119 to Korean Patent Application No. 10-2022-0107891 filed on Aug. 26, 2022, in the Korean Intellectual Property Office, the disclosure of which is incorporated by reference herein in its entirety.

TECHNICAL FIELD

Embodiments of the present disclosure described herein relate to a display device including a pixel.

DISCUSSION OF RELATED ART

A display device is an output device for presentation of information in visual form. A display device typically includes pixels connected to data lines and scan lines. In general, each of the pixels includes a light emitting element, e.g., a light emitting diode, and a pixel circuit for controlling a current flowing to the light emitting element. In response to a data signal, the pixel circuit may control a current that flows from a terminal, to which a first driving voltage is applied, to a terminal, to which a second driving voltage is applied, via the light emitting element. In other words, the pixel circuit may control a current flowing through the light emitting element in response to a data signal. In this case, light having a predetermined luminance may be generated in response to a current flowing via the light emitting element.

SUMMARY

Embodiments of the present disclosure provide a pixel and a display device that operate at various frequencies.

Embodiments of the present disclosure provide a method of operating a pixel at various frequencies.

According to an embodiment of the present disclosure, a pixel includes: a light emitting element; a first transistor including a first electrode, a second electrode electrically connected to the light emitting element, a gate electrode, and a body electrode; a second transistor connected between a first driving voltage line for receiving a first driving voltage and the first electrode of the first transistor and including a gate electrode for receiving a first emission control signal; a first circuit which provides a reference voltage to the gate electrode of the first transistor in response to a first scan signal and a second scan signal; and a second circuit which provides an initialization voltage to the body electrode of the first transistor in response to the first scan signal, the second scan signal, and a second emission control signal.

The first circuit includes: a third transistor connected between a first node and a second driving voltage line for receiving the reference voltage and including a gate electrode for receiving the first scan signal; and a fourth transistor connected between the first node and the gate electrode of the first transistor and including a gate electrode for receiving the second scan signal.

The pixel further including a fifth transistor connected between a data line for receiving a data signal and the first node and including a gate electrode for receiving a third scan signal.

Each of the first transistor, the second transistor, the third transistor, and the fifth transistor is a P-type transistor, and the fourth transistor is an N-type transistor.

The second circuit includes: a sixth transistor connected between an anode of the light emitting element and a third driving voltage line for receiving the initialization voltage and a gate electrode for receiving the first scan signal; a seventh transistor connected between the second electrode of the first transistor and the anode of the light emitting element and including a gate electrode for receiving the second emission control signal; and an eighth transistor connected between the second electrode of the first transistor and the body electrode of the first transistor and including a gate electrode for receiving the second scan signal.

During a first period, the reference voltage is provided to the gate electrode of the first transistor by the first circuit, and the initialization voltage is provided to the body electrode of the first transistor by the second circuit, and during a second period, the first driving voltage is provided to the first electrode of the first transistor by the second transistor.

During the second period, a voltage level of the body electrode of the first transistor increases from the initialization voltage until a threshold voltage of the first transistor reaches a difference between the first driving voltage and the reference voltage.

During the second period, each of the first emission control signal and the second scan signal is at an active level.

Each of the first transistor, the second transistor, the sixth transistor, and the seventh transistor is a P-type transistor, and the eighth transistor is an N-type transistor.

The pixel further includes: a ninth transistor connected between a fourth driving voltage line for receiving a bias voltage and the first electrode of the first transistor and including a gate electrode for receiving a fourth scan signal.

The pixel further includes: a first capacitor connected between the first driving voltage line and the gate electrode of the first transistor; and a second capacitor connected between the first driving voltage line and the body electrode of the first transistor.

According to an embodiment of the present disclosure, a display device includes: a pixel connected to a first scan line, a second scan line, a first emission control line, and a second emission control line; a driving circuit which outputs a first scan signal, a second scan signal, a first emission control signal, and a second emission control signal, which are used to drive the pixel, to the first scan line, the second scan line, the first emission control line, and the second emission control line, respectively; and a driving controller which controls the driving circuit, wherein the pixel includes: a light emitting element; a first transistor including a first electrode, a second electrode electrically connected to the light emitting element, a gate electrode, and a body electrode; a second transistor connected between a first driving voltage line for receiving a first driving voltage and the first electrode of the first transistor and including a gate electrode for receiving the first emission control signal; a first circuit which provides a reference voltage to the gate electrode of the first transistor in response to the first scan signal and the second scan signal; and a second circuit which provides an initialization voltage to the body electrode of the first transistor in response to the first scan signal, the second scan signal, and the second emission control signal.

The first circuit includes: a third transistor connected between a first node and a second driving voltage line for receiving the reference voltage and including a gate electrode for receiving the first scan signal; and a fourth transistor connected between the first node and the gate electrode of the first transistor and including a gate electrode for receiving the second scan signal.

The display device further includes: a fifth transistor connected between a data line for receiving a data signal and the first node and including a gate electrode for receiving a third scan signal.

The second circuit includes: a sixth transistor connected between an anode of the light emitting element and a third driving voltage line for receiving the initialization voltage and a gate electrode for receiving the first scan signal; a seventh transistor connected between the second electrode of the first transistor and the anode of the light emitting element and including a gate electrode for receiving the second emission control signal; and an eighth transistor connected between the second electrode of the first transistor and the body electrode of the first transistor and including a gate electrode for receiving the second scan signal.

During a first period, the reference voltage is provided to the gate electrode of the first transistor by the first circuit, and the initialization voltage is provided to the body electrode of the first transistor by the second circuit, and during a second period, the first driving voltage is provided to the first electrode of the first transistor by the second transistor.

The display device further includes a ninth transistor connected between a fourth driving voltage line for receiving a bias voltage and the first electrode of the first transistor and including a gate electrode for receiving a fourth scan signal.

The driving circuit includes: an emission driving circuit which outputs the first emission control signal and the second emission control signal; a first scan driving circuit which outputs the second scan signal; and a second scan driving circuit which outputs the first scan signal, the third scan signal, and the fourth scan signal, wherein the first scan signal, the third scan signal, and the fourth scan signal are signals having the same pulse widths as one another and different phases from one another.

According to an embodiment of the present disclosure, there is provided an operating method of a pixel, the pixel including a first transistor including a first electrode, a second electrode electrically connected to a light emitting element, a gate electrode, and a body electrode, and a second transistor connected between the second electrode of the first transistor and the body electrode, the method including: providing a reference voltage to the gate electrode of the first transistor; providing an initialization voltage to the body electrode of the first transistor; and providing a first driving voltage to the first electrode of the first transistor, wherein the first driving voltage provided to the first electrode of the first transistor is delivered to the body electrode of the first transistor through the second electrode of the first transistor that is connected to the second transistor.

A voltage level of the body electrode of the first transistor increases from the initialization voltage until a threshold voltage of the first transistor reaches a difference between the first driving voltage and the reference voltage.

According to an embodiment of the present disclosure, a pixel includes: a light emitting element; a first transistor including a first electrode, a second electrode, a gate electrode and a body electrode; a second transistor connected between the first transistor and a driving voltage line; a first circuit including third and fourth transistors, the third transistor connected to a first electrode of the fourth transistor, the third transistor being turned on in response to a first scan signal, the fourth transistor being turned on in response to a second scan signal, the first circuit providing a reference voltage to the gate electrode of the first transistor when the third and fourth transistors are turned on; and a second circuit including fifth, sixth and seventh transistors, the fifth transistor being turned on in response to the first scan signal, the sixth transistor being turned on in response to an emission control signal and the seventh transistor being turned on in response to the second scan signal, the second circuit providing an initialization voltage to the body electrode of the first transistor when the fifth, sixth and seventh transistors are turned on.

The fourth and seventh transistors are different type transistors than the first, second, third, fifth and sixth transistors.

BRIEF DESCRIPTION OF THE FIGURES

The above and other features of the present disclosure will become apparent by describing in detail embodiments thereof with reference to the accompanying drawings.

DETAILED DESCRIPTION OF THE EMBODIMENTS

Figure 1:
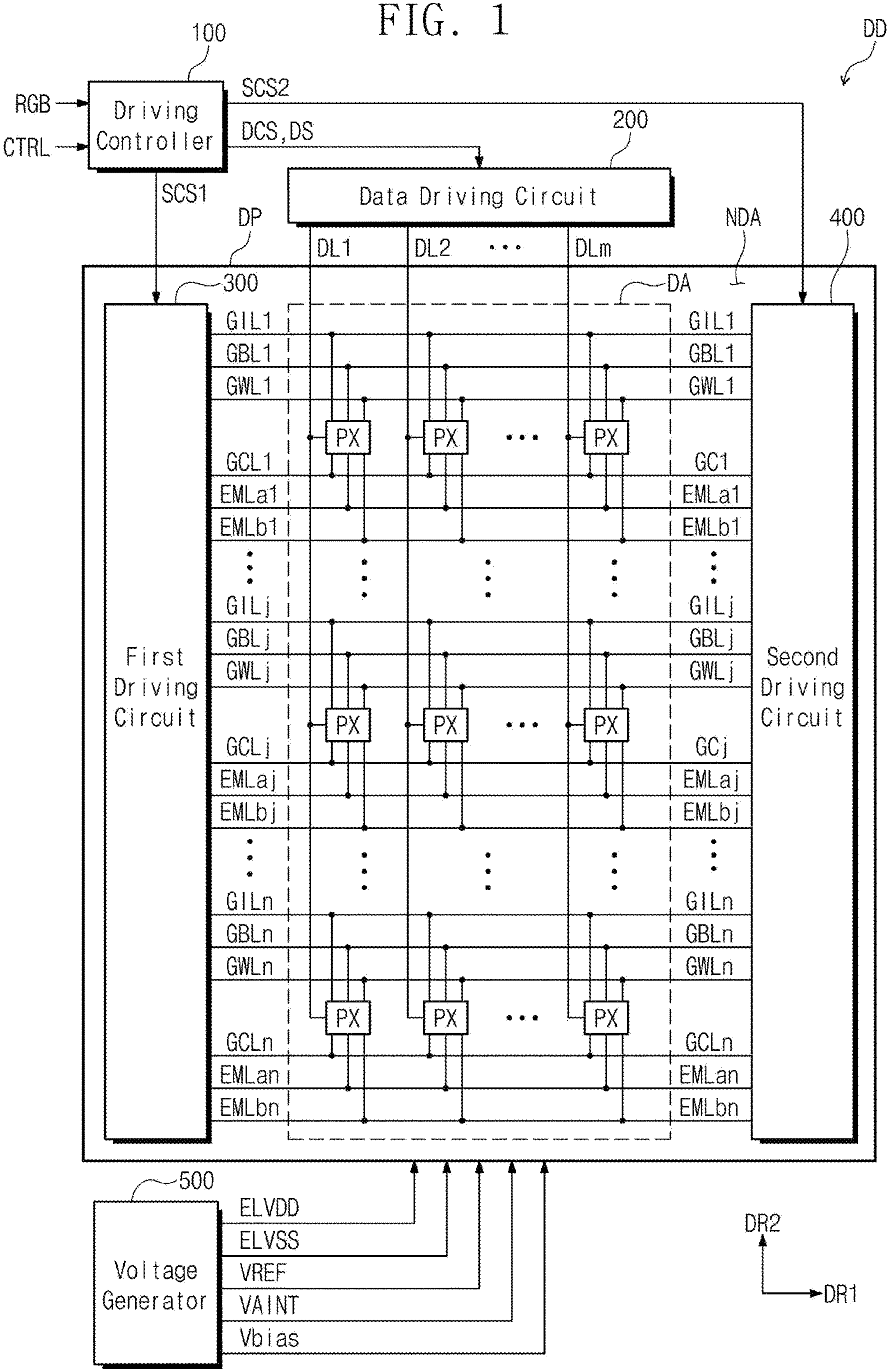
FIG. 1 is a block diagram of a display device, according to an embodiment of the present disclosure.

In the specification, the expression that a first component (or region, layer, part, etc.) is "on", "connected with", or "coupled with" a second component may mean that the first component is directly on, connected with, or coupled with the second component or may mean that a third component is interposed therebetween.

Like reference numerals may refer to like components. In addition, in drawings, the thickness, ratio, and dimension of components are may exaggerated for a more effective description of the technical contents herein. The term "and/or" includes one or more combinations of the associated listed items.

The terms "first", "second", etc. are used to describe various components, but the components are not limited by the terms. These terms are used to differentiate one component from another component. For example, a first component may be referred to as a second component, and similarly, the second component may be referred to as the first component. The articles "a," "an," and "the" are singular in that they have a single referent, but the use of the singular form in the specification should not preclude the presence of more than one referent.

In addition, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, and do not preclude the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in commonly used dictionaries should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a block diagram of a display device DD, according to an embodiment of the present disclosure.

Referring to FIG. 1, a display device DD includes a display panel DP, a driving controller 100, a data driving circuit 200, and a voltage generator 500. The display device DD according to an embodiment of the present disclosure may be a portable terminal such as a tablet personal computer (PC), a smartphone, a personal digital assistant (PDA), a portable multimedia player (PMP), a game console, a wristwatch-type electronic device, and the like. However, the present disclosure is not limited thereto. The display device DD according to an embodiment of the present disclosure may be used for small and medium electronic devices such as a PC, a notebook computer, a kiosk, a car navigation unit, and a camera, in addition to large-sized electronic equipment such as a television or an outside billboard. The display device DD is not limited to the examples provided above, for example, the display device DD may be applied to any other electronic device(s) within the scope of the present disclosure.

The driving controller 100 receives an input signal including an input image signal RGB and a control signal CTRL. The driving controller 100 generates an output image signal DS by converting a data format of the input image signal RGB to be suitable for the interface specification of the data driving circuit 200. The driving controller 100 may output, to the display panel DP, a first scan control signal SCS1, a second scan control signal SCS2, and a data control signal DCS for controlling an image to be displayed.

The data driving circuit 200 receives the data control signal DCS and the output image signal DS from the driving controller 100. The data driving circuit 200 converts the output image signal DS into data signals and outputs the data signals to a plurality of data lines DL1 to DLm to be described later. The data signals refer to analog voltages corresponding to a grayscale value of the output image signal DS.

The voltage generator 500 generates voltages used to operate the display panel DP. In an embodiment, the voltage generator 500 generates a first driving voltage ELVDD, a second driving voltage ELVSS, an initialization voltage VAINT, a reference voltage VREF, and a bias voltage Vbias.

The display panel DP includes scan lines GIL1 to GILn, GBL1 to GBLn, GWL1 to GWLn, and GCL1 to GCLn, emission control lines EMLa1 to EMLan and EMLb1 to EMLbn, the data lines DL1 to DLm, and pixels PX. The display panel DP may include a first driving circuit 300 and a second driving circuit 400. In an embodiment, the first driving circuit 300 is arranged on a first side of the display panel DP, and the second driving circuit 400 is arranged on a second side of the display panel DP. The scan lines GIL1 to GILn, GBL1 to GBLn, GWL1 to GWLn, and GCL1 to GCLn and the emission control lines EMLa1 to EMLan and EMLb1 to EMLbn may be electrically connected to the first driving circuit 300 and the second driving circuit 400.

The scan lines GIL1 to GILn, GBL1 to GBLn, GWL1 to GWLn, and GCL1 to GCLn and the emission control lines EMLa1 to EMLan and EMLb1 to EMLbn are spaced from one another in a second direction DR2. The data lines DL1 to DLm extend from the data driving circuit 200 in a direction opposite to the second direction DR2, and are spaced from one another in the first direction DR1.

In the example shown in FIG. 1, the first driving circuit 300 and the second driving circuit 400 face each other with the pixels PX interposed therebetween, but the present disclosure is not limited thereto. In an embodiment, the display panel DP may include only one of the first driving circuit 300 and the second driving circuit 400.

The plurality of pixels PX are electrically connected to the scan lines GIL1 to GILn, GBL1 to GBLn, GWL1 to GWLn, and GCL1 to GCLn, the emission control lines EMLa1 to EMLan and EMLb1 to EMLbn and the data lines DL1 to DLm. Each of the plurality of pixels PX may be electrically connected to four scan lines and two emission control lines. For example, as shown in FIG. 1, a first row of pixels may be connected to the scan lines GIL1, GBL1, GWL1, and GCL1 and the emission control lines EMLa1 and EMLb1. Furthermore, a j-th row of pixels may be connected to the scan lines GILj, GBLj, GWLj, and GCLj and the emission control lines EMLaj and EMLbj.

Each of the plurality of pixels PX may include one or more transistors and one or more capacitors. The first driving circuit 300 and the second driving circuit 400 may include transistors formed through the same process as transistors in the pixels PX.

Each of the plurality of pixels PX receives the first driving voltage ELVDD, the second driving voltage ELVSS, the initialization voltage VAINT, the reference voltage VREF, and the bias voltage Vbias.

The first driving circuit 300 receives the first scan control signal SCS1 from the driving controller 100. In response to the first scan control signal SCS1, the first driving circuit 300 may output scan signals to the scan lines GIL1 to GILn, GBL1 to GBLn, GWL1 to GWLn, and GCL1 to GCLn and may output emission control signals to the emission control lines EMLa1 to EMLan and EMLb1 to EMLbn.

The second driving circuit 400 receives the second scan control signal SCS2 from the driving controller 100. In response to the second scan control signal SCS2, the second driving circuit 400 may output scan signals to the scan lines GIL1 to GILn, GBL1 to GBLn, GWL1 to GWLn, and GCL1 to GCLn and may output emission control signals to the emission control lines EMLa1 to EMLan and EMLb1 to EMLbn.

Figure 2:
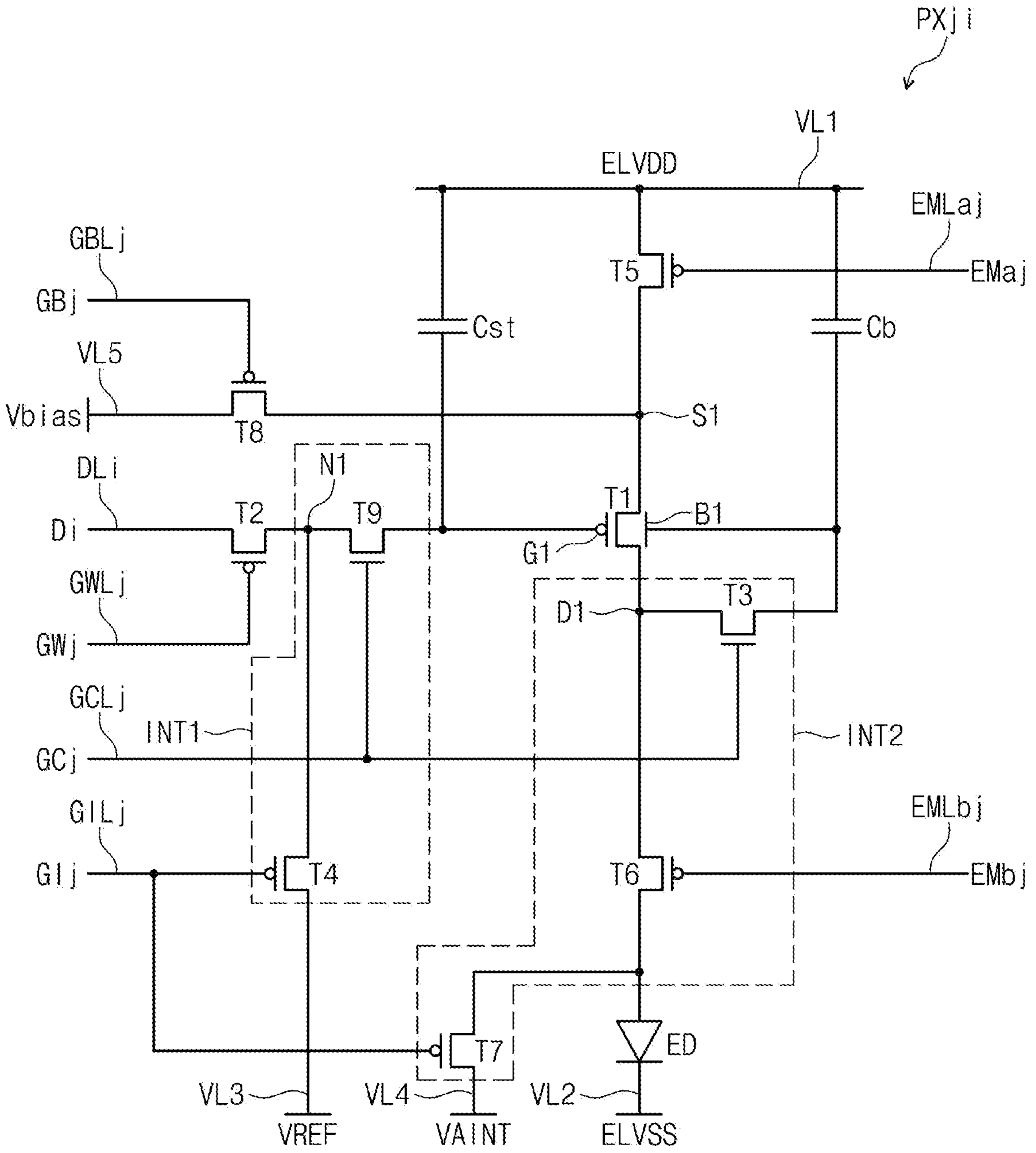
FIG. 2 is a circuit diagram of a pixel, according to an embodiment of the present disclosure.

FIG. 2 is a circuit diagram of a pixel PXji, according to an embodiment of the present disclosure.

FIG. 2 illustrates an equivalent circuit diagram of the pixel PXji connected to the i-th data line DLi, the j-th scan lines GILj, GBLj, GWLj, and GCLj and the j-th emission control lines EMLaj and EMLbj, which are illustrated in FIG. 1.

Each of the plurality of pixels PX shown in FIG. 1 may have the same circuit configuration as the equivalent circuit diagram of the pixel PXji shown in FIG. 2. In an embodiment, the pixel PXji includes first to ninth transistors T1, T2, T3, T4, T5, T6, T7, T8, and T9, first and second capacitors Cst and Cb, and at least one light emitting element ED. In an embodiment, the light emitting element ED may be a light emitting diode.

Among the first to ninth transistors T1 to T9, the third and ninth transistors T3 and T9 are N-type transistors that use an oxide semiconductor as a semiconductor layer, and each of the first, second, fourth, fifth, sixth, seventh, and eighth transistors T1, T2, T4, T5, T6, T7, and T8 is a P-type transistor having a low-temperature polycrystalline silicon (LTPS) semiconductor layer. However, the present disclosure is not limited thereto. For example, all of the first to ninth transistors T1 to T9 may be P-type transistors or N-type transistors. In an embodiment, at least one of the first to ninth transistors T1 to T9 may be an N-type transistor, and remainder of the first to ninth transistors T1 to T9 may be P-type transistors.

The scan lines GILj, GBLj, GWLj, and GCLj may deliver scan signals GIj, GBj. GWj, and GCj, respectively. The emission control lines EMLaj and EMLbj may deliver emission control signals EMaj and EMbj, respectively. The data line DLi transfers a data signal Di. The data signal Di may have a voltage level corresponding to the input image signal RGB that is input to the display device DD (see FIG. 1). First to fifth driving voltage lines VL1, VL2, VL3, VL4, and VL5 may deliver the first driving voltage ELVDD, the second driving voltage ELVSS, the reference voltage VREF, the initialization voltage VAINT, and the bias voltage Vbias, respectively.

The first transistor T1 includes a first electrode S1 electrically connected to the first driving voltage line VL1 via the fifth transistor T5, a second electrode D1 electrically connected to an anode of the light emitting element ED via the sixth transistor T6, a gate electrode G1 connected to a first end of the first capacitor Cst, and a body electrode B1 (or a lower gate electrode) connected to a second electrode of the third transistor T3. The body electrode B1 is also connected to a first end of the second capacitor Cb. Depending on the switching operation of the second transistor T2 and the ninth transistor T9, the first transistor T1 may receive the data signal Di transmitted by the data line DLi and may supply a driving current to the light emitting element ED.

The second transistor T2 includes a first electrode connected to the data line DLi, a second electrode connected to a first node N1, and a gate electrode connected to the scan line GWLj. The second transistor T2 may be turned on in response to the scan signal GWj received through the scan line GWLj and then may deliver the data signal Di delivered from the data line DLi to the first node N1.

The third transistor T3 includes a first electrode connected to the second electrode D1 of the first transistor T1, a second electrode connected to the body electrode B1 of the first transistor T1, and a gate electrode connected to the scan line GCLj which may also be referred to as a compensation scan line. The third transistor T3 is turned on in response to the scan signal GCj received through the compensation scan line GCLj to connect the second electrode D1 of the first transistor T1 to the body electrode B1. The scan signal GCj may also be referred to as a compensation scan signal.

The fourth transistor T4 includes a first electrode connected to the first node N1, a second electrode connected to the third driving voltage line VL3, through which the reference voltage VREF is supplied, and a gate electrode connected to the scan line GILj which may also be referred to as an initialization scan line. The fourth transistor T4 is turned on in response to the scan signal GIj received through the initialization scan line GILj to deliver the reference voltage VREF to the first node N1. The scan signal GIj may also be referred to as an initialization scan signal GIj. When the ninth transistor T9 is turned on, a voltage (e.g., the reference voltage VREF) of the first node N1 may be delivered to the gate electrode G1 of the first transistor T1 such that the voltage of the gate electrode G1 of the first transistor T1 may be initialized.

The fifth transistor T5 includes a first electrode connected to the first driving voltage line VL1, a second electrode connected to the first electrode S1 of the first transistor T1, and a gate electrode connected to the emission control line EMLaj.

The sixth transistor T6 includes a first electrode connected to the second electrode D1 of the first transistor T1, a second electrode connected to the anode of the light emitting element ED, and a gate electrode connected to the emission control line EMLbj.

When the fifth transistor T5 and the sixth transistor T6 are turned on in response to the emission control signals EMaj and EMbj received through the emission control lines EMLaj and EMLbj, a current may be delivered from the first driving voltage line VL1 to the light emitting element ED through the fifth transistor T5, the first transistor T1, and the sixth transistor T6.

The seventh transistor T7 includes a first electrode connected to the anode of the light emitting element ED, a second electrode connected to the fourth driving voltage line VL4, and a gate electrode connected to the scan line GILj. The seventh transistor T7 may be turned on in response to the scan signal GIj received through the scan line GILj to initialize the anode of the light emitting element ED to the initialization voltage VAINT of the fourth driving voltage line VL4.

The eighth transistor T8 includes a first electrode connected to the fifth driving voltage line VL5 provided with the bias voltage Vbias, a second electrode connected to the first electrode S1 of the first transistor T1, and a gate electrode connected to the scan line GBLj. The eighth transistor T8 is turned on in response to the scan signal GBj received through the scan line GBLj to provide the bias voltage Vbias to the first electrode S1 of the first transistor T1.

The ninth transistor T9 includes a first electrode connected to the first node N1, a second electrode connected to the gate electrode G1 of the first transistor T1, and a gate electrode connected to the scan line GCLj. The ninth transistor T9 is turned on in response to the scan signal GCj received through the scan line GCLj to provide the voltage of the first node N1 to the gate electrode G1 of the first transistor T1.

The first end of the first capacitor Cst is connected to the gate electrode of the first transistor T1, and a second end of the first capacitor Cst is connected to the first driving voltage line VL1. The second capacitor Cb may be formed between the first voltage line VL1 and the body electrode B1 of the first transistor T1. The first voltage line VL1 may be connected to a second end of the second capacitor Cb.

The anode of the light emitting element ED may be connected to the second electrode of the sixth transistor T6, and a cathode of the light emitting element ED may be connected to the second driving voltage line VL2 that delivers the second driving voltage ELVSS.

A circuit configuration of the pixel PXji according to an embodiment of the present disclosure is not limited to an embodiment in FIG. 2. The number of transistors included in the pixel PXji, the number of capacitors included in the pixel PXji, and the connection relationship thereof may be modified in various manners.

In an embodiment, the data signal Di is directly delivered to the gate electrode G1 of the first transistor T1 through the second transistor T2 and the ninth transistor T9 without passing through a capacitor. Compared to the data signal Di being delivered to the gate electrode G1 of the first transistor T1 through the capacitor, when the data signal Di is directly delivered to the first transistor T1, the voltage level of the data signal Di may be maintained to be low. Accordingly, power consumption of the display device DD may be minimized.

In addition, leakage current may be minimized by configuring some (e.g., the third transistor T3 and the ninth transistor T9) of the transistors in the pixel PXji as N-type transistors. As a result, the pixel PXji may operate at a low operating frequency.

In an embodiment, a first circuit INT1 may include the fourth transistor T4 and the ninth transistor T9. The first circuit INT1 may deliver the reference voltage VREF to the gate electrode G1 of the first transistor T1 in response to the scan signals GIj and GCj.

In an embodiment, a second circuit INT2 may include the third transistor T3, the sixth transistor T6, and the seventh transistor T7. The second circuit INT2 may deliver the initialization voltage VAINT to the body electrode B1 of the first transistor T1 in response to the scan signals GIj and GCj and the emission control signal EMbj.

In the embodiment shown in FIG. 2, the pixel PXji includes: a light emitting element ED; a first transistor (T1) including a first electrode, a second electrode electrically connected to the light emitting element, a gate electrode, and a body electrode; a second transistor (T5) connected between a first driving voltage line for receiving a first driving voltage and the first electrode of the first transistor and including a gate electrode for receiving a first emission control signal; a first circuit (INT1) which provides a reference voltage to the gate electrode of the first transistor in response to a first scan signal and a second scan signal; and a second circuit (INT2) which provides an initialization voltage to the body electrode of the first transistor in response to the first scan signal, the second scan signal, and a second emission control signal.

Figure 3:
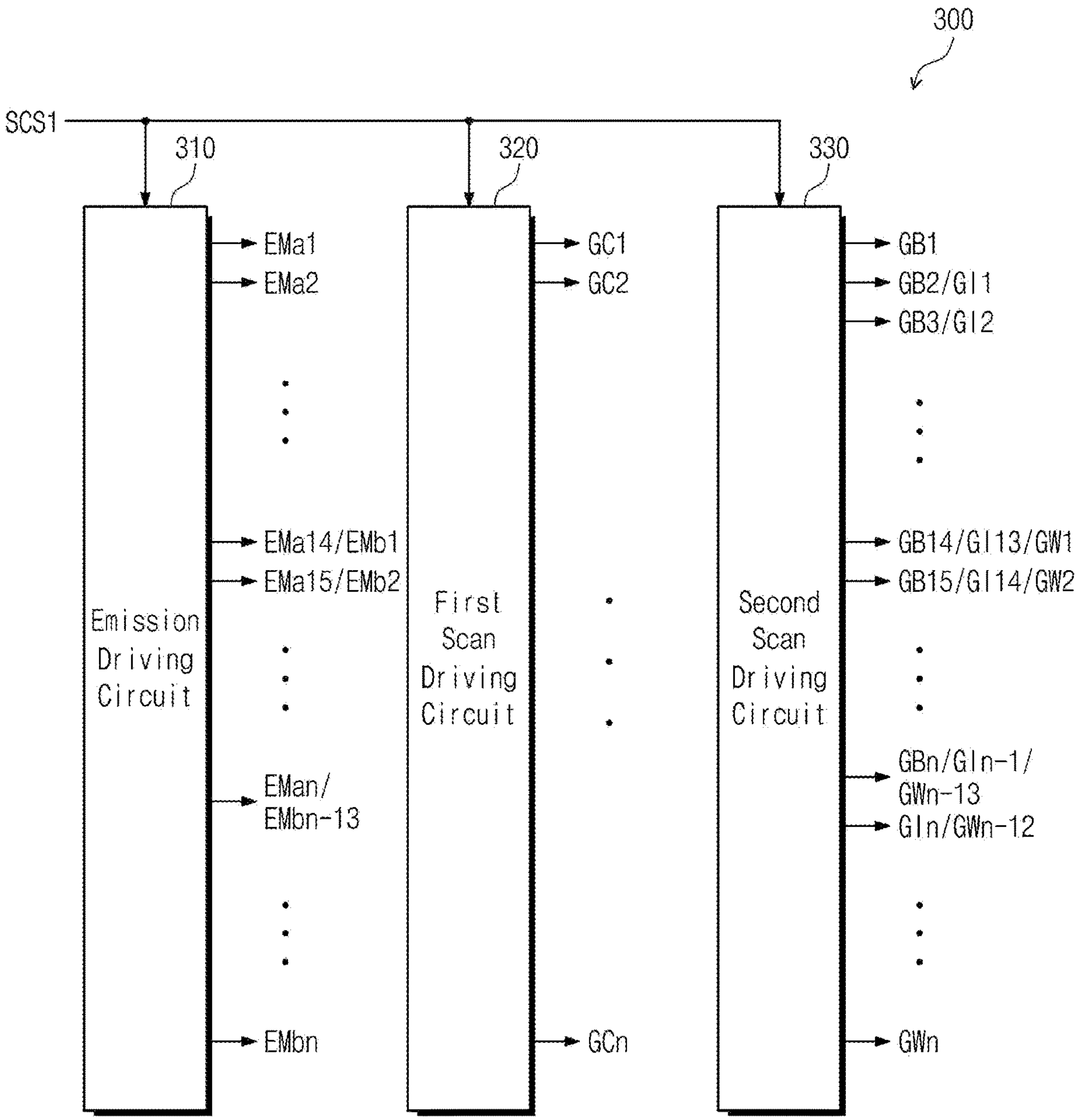
FIG. 3 is a block diagram illustrating a first driving circuit illustrated in FIG. 1.

FIG. 3 is a block diagram illustrating the first driving circuit 300 illustrated in FIG. 1.

Referring to FIG. 3, the first driving circuit 300 includes an emission driving circuit 310, a first scan driving circuit 320, and a second scan driving circuit 330.

The emission driving circuit 310 outputs the emission control signals EMa1 to EMan and EMb1 to EMbn to be provided to the emission control lines EMLa1 to EMLan and EMLb1 to EMLbn shown in FIG. 1 in response to the first scan control signal SCS1. In an embodiment, some of the emission control signals EMa1 to EMan and EMb1 to EMbn may be the same signals as one another. For example, the emission control signals EMa14 and EMb1 may be the same signal as each other, and the emission control signals EMan and EMbn-13 may be the same signal as each other. For example, the emission control signals EMa1 and EMb1 may be signals having the same pulse width and different phases. Moreover, the emission control signals EMan and EMb In may be signals with the same pulse width and different phases.

The emission driving circuit 310 is designed to output the emission control signals EMa1 to EMan and EMb1 to EMbn in common, thereby minimizing a circuit area of the emission driving circuit 310.

The first scan driving circuit 320 outputs scan signals GC1 to GCn to be provided to the scan lines GCL1 to GCLn shown in FIG. 1 in response to the first scan control signal SCS1.

In response to the first scan control signal SCS1, the second scan driving circuit 330 outputs the scan signals GB1 to GBn to be provided to the scan lines GBL1 to GBLn, the scan signals GI1 to GIn to be provided to the scan lines GIL1 to GILn, and the scan signals GW1 to GWn to be provided to the scan lines GWL1 to GWLn, which are shown in FIG. 1. In an embodiment, some of the scan signals GB1 to GBn, some of the scan signals GI1 to GIn, and some of the scan signals GW1 to GWn may be the same signal. For example, the scan signals GB2 and GI1 may be the same signal, the scan signals GB14, GI13, and GW1 may be the same signal, and the scan signals GBn, GIn-1, and GWn-13 may be the same signal. In other words, the scan signals GB1, GI1, and GW1 may be signals having the same pulse width and different phases. In other words, the scan signals GBn, GIn, and GWn may be signals having the same pulse width and different phases. In another example, the scan signals GB3 and GI2 may be the same scan signal and the scan signals GB15, GI14 and GW2 may be the same scan signal.

The second scan driving circuit 330 may be designed to output the scan signals GB1 to GBn, the scan signals GI1 to GIn, and the scan signals GW1 to GWn in common, thereby minimizing the circuit area of the second scan driving circuit 330.

Figure 4:
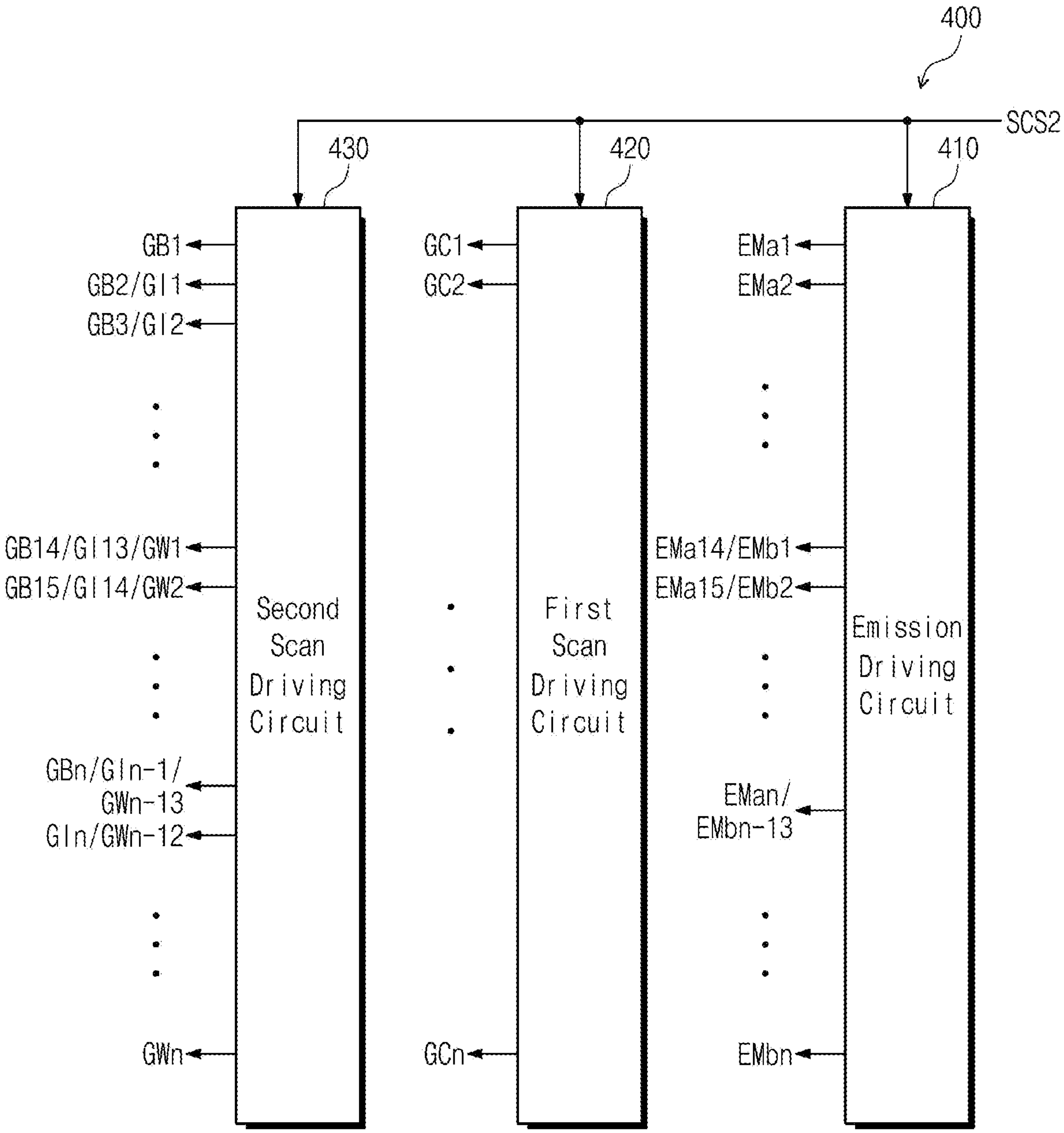
FIG. 4 is a block diagram illustrating a second driving circuit illustrated in FIG. 1.

FIG. 4 is a block diagram illustrating the second driving circuit 400 illustrated in FIG. 1.

Referring to FIG. 4, the second driving circuit 400 includes an emission driving circuit 410, a first scan driving circuit 420, and a second scan driving circuit 430.

The emission driving circuit 410 outputs the emission control signals EMa1 to EMan and EMb1 to EMbn to be provided to the emission control lines EMLa1 to EMLan and EMLb1 to EMLbn shown in FIG. 1 in response to the second scan control signal SCS2. In an embodiment, some of the emission control signals EMa1 to EMan and EMb1 to EMbn may be the same signals as one another. For example, the emission control signals EMa14 and EMb1 may be the same signal as each other, and the emission control signals EMan and EMbn-13 may be the same signal as each other.

The emission driving circuit 410 is designed to output the emission control signals EMa1 to EMan and EMb1 to EMbn in common, thereby minimizing a circuit area of the emission driving circuit 410.

The first scan driving circuit 420 outputs the scan signals GC1 to GCn to be provided to the scan lines GCL1 to GCLn.

In response to the second scan control signal SCS2, the second scan driving circuit 430 outputs the scan signals GB1 to GBn to be provided to the scan lines GBL1 to GBLn, the scan signals GI1 to GIn to be provided to the scan lines GIL1 to GILn, and the scan signals GW1 to GWn to be provided to the scan lines GWL1 to GWLn, which are shown in FIG.

1. In an embodiment, some of the scan signals GB1 to GBn, some of the scan signals GI1 to Gin, and some of the scan signals GW1 to GWn may be the same signal. For example, the scan signals GB2 and GI1 may be the same signal, the scan signals GB14, GI13, and GW1 may be the same signal, and the scan signals GBn, GIn-1, and GWn-13 may be the same signal.

The second scan driving circuit 430 may be designed to output the scan signals GB1 to GBn, the scan signals GI1 to GIn, and the scan signals GW1 to GWn in common, thereby minimizing the circuit area of the second scan driving circuit 430.

Figure 5:
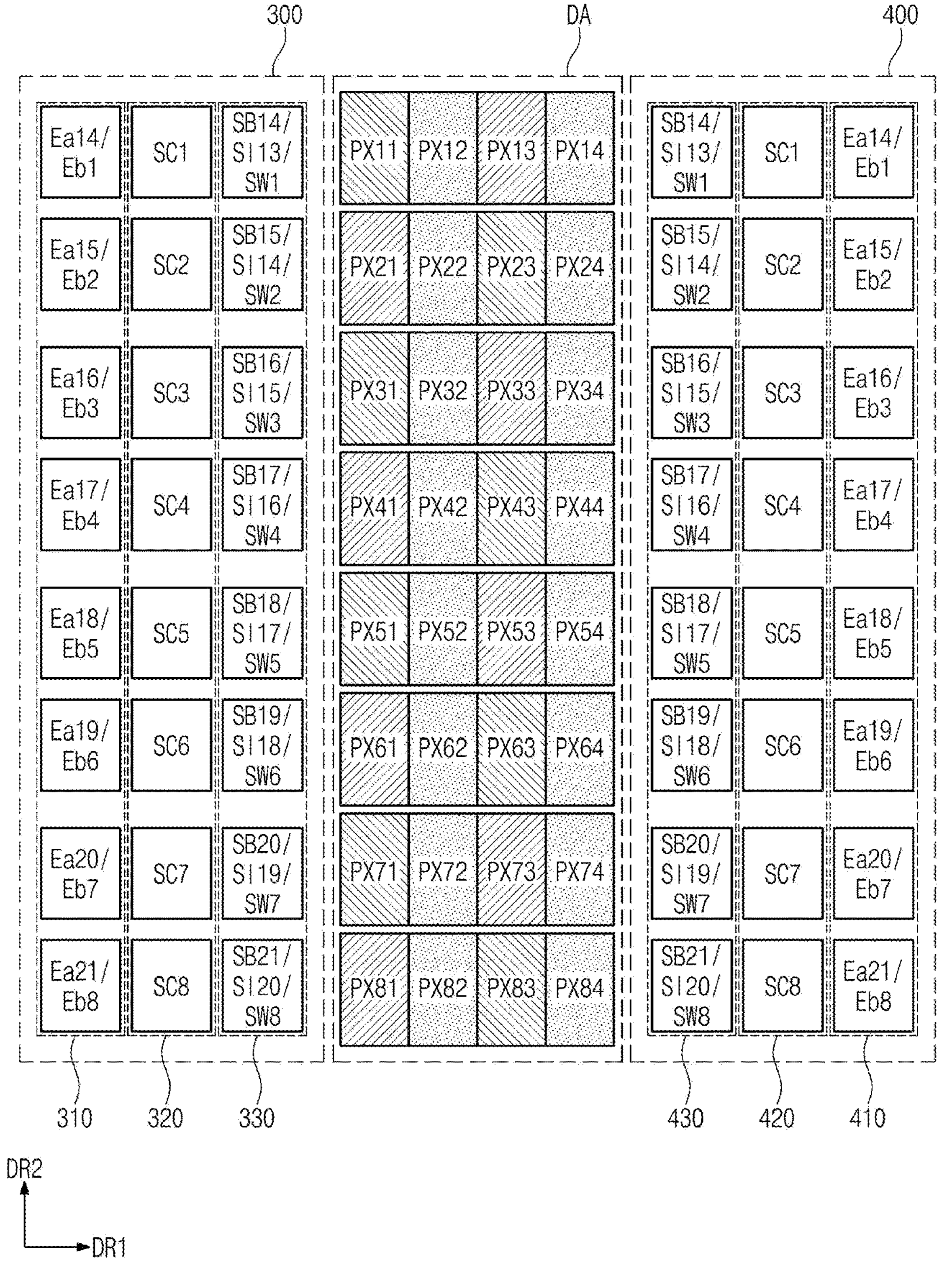
FIG. 5 is a block diagram illustrating the first driving circuit illustrated in FIG. 3 and the second driving circuit illustrated in FIG. 4.

FIG. 5 is a block diagram illustrating the first driving circuit 300 illustrated in FIG. 3 and the second driving circuit 400 illustrated in FIG. 4.

Referring to FIGS. 3 to 5, pixels PX11 to PX14, PX21 to PX24, PX31 to PX34, PX41 to PX44, PX51 to PX54, PX61 to PX64, PX71 to PX74, and PX81 to PX84 are arranged in a display area DA.

FIG. 5 shows an example in which four pixels are arranged in the first direction DR1 and eight pixels are arranged in the second direction DR2 in the display area DA. However, the number of pixels arranged in the display area DA may be variously changed.

The pixels PX11, PX23, PX31, PX43, PX51, PX63, PX71, and PX83 may be first color pixels (e.g., red pixels); the pixels PX13, PX21, PX33, PX41, PX53, PX61, PX73, and PX81 may be second color pixels (e.g., blue pixels); and, the remaining pixels PX12, PX14, PX22, PX24, PX32, PX34, PX42, PX44, PX52, PX54, PX62, PX64, PX72, PX74, PX82, and PX84 may be third color pixels (e.g., green pixels). The arrangement of the first color pixel, the second color pixel, and the third color pixel is merely an example, and the present disclosure is not limited thereto. Moreover, the pixels PX11, PX23, PX31, PX43, PX51, PX63, PX71, and PX83 may include pixels having various colors such as not only red pixels, green pixels, and blue pixels, but also white pixels, yellow pixels, and magenta pixels.

The emission driving circuit 310 in the first driving circuit 300 includes emission stages Ea14/Eb1 to Ea21/Eb8. The emission stages Ea14/Eb1 to Ea21/Eb8 may output emission control signals for driving the corresponding pixel row of pixels. For example, the emission stage Ea14/Eb1 may output the emission control signal EMb1 for driving a first pixel row of pixels PX11 to PX14. The emission control signal EMa14 output from the emission stage Ea14/Eb1 may be provided to a fourteenth pixel row of pixels.

The emission stage Ea15/Eb2 may output the emission control signal EMb2 for driving a corresponding second pixel row of pixels PX21 to PX24. The emission control signal EMa15 output from the emission stage Ea15/Eb2 may be provided to a fifteenth pixel row of pixels.

The emission driving circuit 310 may further include emission stages for outputting the emission control signals EMa1 to EMa8 for driving pixels PX11 to PX14, PX21 to PX24, PX31 to PX34, PX41 to PX44, PX51 to PX54, PX61 to PX64, PX71 to PX74, and PX81 to PX84.

Only eight rows of pixels PX11 to PX14, PX21 to PX24, PX31 to PX34, PX41 to PX44, PX51 to PX54, PX61 to PX64, PX71 to PX74, and PX81 to PX84 are shown in FIG. 5. The present disclosure is not limited thereto. The number of pixels arranged in the display area DA may be variously changed. In an embodiment, a k-th emission stage (Eak+13/Ebk) corresponding to a k-th pixel row may output emission control signals EMak+13 and EMbk (here, 'k' is a positive integer (k≤n)). The first scan driving circuit 320 within the first driving circuit 300 includes compensation stages SC1 to SC8. Each of the compensation stages SC1 to SC8 may drive a corresponding pixel row of pixels. For example, the compensation stage SC1 may output the scan signal GC1 for driving a corresponding first pixel row of pixels PX11 to PX14. The compensation stage SC2 may output the scan signal GC2 for driving a corresponding second pixel row of pixels PX21 to PX24.

The second scan driving circuit 330 within the first driving circuit 300 includes scan stages SB14/SI13/SW1 to SB21/SI20/SW8. Each of the scan stages SB14/SI13/SW1 to SB21/SI20/SW8 may drive a corresponding pixel row of pixels. For example, the scan stage SB14/SI13/SW1 may output the scan signal GW1 for driving a corresponding first pixel row of pixels PX11 to PX14. The scan signal GB14 output from the scan stage SB14/SI13/SW1 may be provided to the fourteenth pixel row of pixels. The scan signal GI13 output from the scan stage SB14/SI13/SW1 may be provided to the thirteenth pixel row of pixels.

The scan stage SB15/SI14/SW2 may output the scan signal GW2 for driving a corresponding second pixel row of pixels PX21 to PX24. The scan signal GB15 output from the scan stage SB15/SI14/SW2 may be provided to the fifteenth pixel row of pixels. The scan signal GI14 output from the scan stage SB15/SI14/SW2 may be provided to the fourteenth pixel row of pixels.

The second scan driving circuit 330 may further include scan stages for outputting the scan signal GB1 to GB8 and GI1 to GI8 for driving pixels PX11 to PX14, PX21 to PX24, PX31 to PX34, PX41 to PX44, PX51 to PX54, PX61 to PX64, PX71 to PX74, and PX81 to PX84.

The emission driving circuit 410 in the second driving circuit 400 includes emission stages Ea14/Eb1 to Ea21/Eb8. Because the emission stages Ea14/Eb1 to Ea21/Eb8 of the emission driving circuit 410 are substantially identical to the emission stages Ea14/Eb1 to Ea21/Eb8 in the emission driving circuit 310, the same reference numerals are used, and additional descriptions are omitted to avoid redundancy.

The first scan driving circuit 420 within the second driving circuit 400 includes compensation stages SC1 to SC8. Because the compensation stages SC1 to SC8 in the first scan driving circuit 420 are substantially the same as the compensation stages SC1 to SC8 in the first scan driving circuit 320, the same reference numerals are used, and additional descriptions are omitted to avoid redundancy.

The second scan driving circuit 430 within the second driving circuit 400 includes the scan stages SB14/SI13/SW1 to SB21/SI20/SW8. Because the scan stages SB14/SI13/SW1 to SB21/SI20/SW8 of the second scan driving circuit 430 are substantially the same as the scan stages SB14/SI13/SW1 to SB21/SI20/SW8 in the first scan driving circuit 330, the same reference numerals are used, and additional descriptions are omitted to avoid redundancy.

Figure 6:
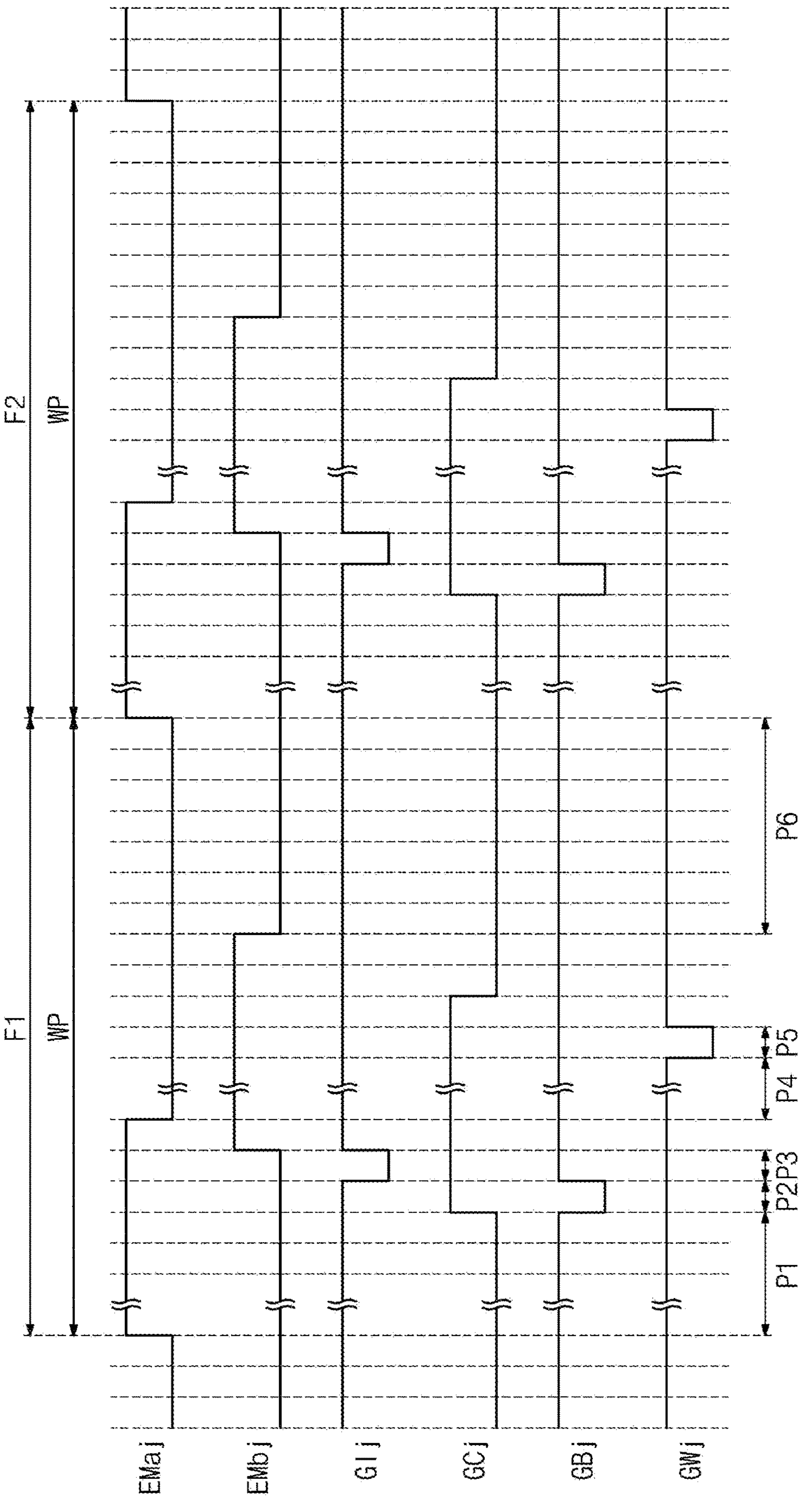
FIG. 6 is a timing diagram for describing an operation of a pixel illustrated in FIG. 2.

FIG. 6 is a timing diagram for describing an operation of the pixel PXji shown in FIG. 2.

FIGS. 7A to 7F are diagrams for describing an operation of the pixel PXji.

Hereinafter, an operation of a display device according to an embodiment will be described with reference to FIGS. 6 and 7A to 7F.

Figure 7A:
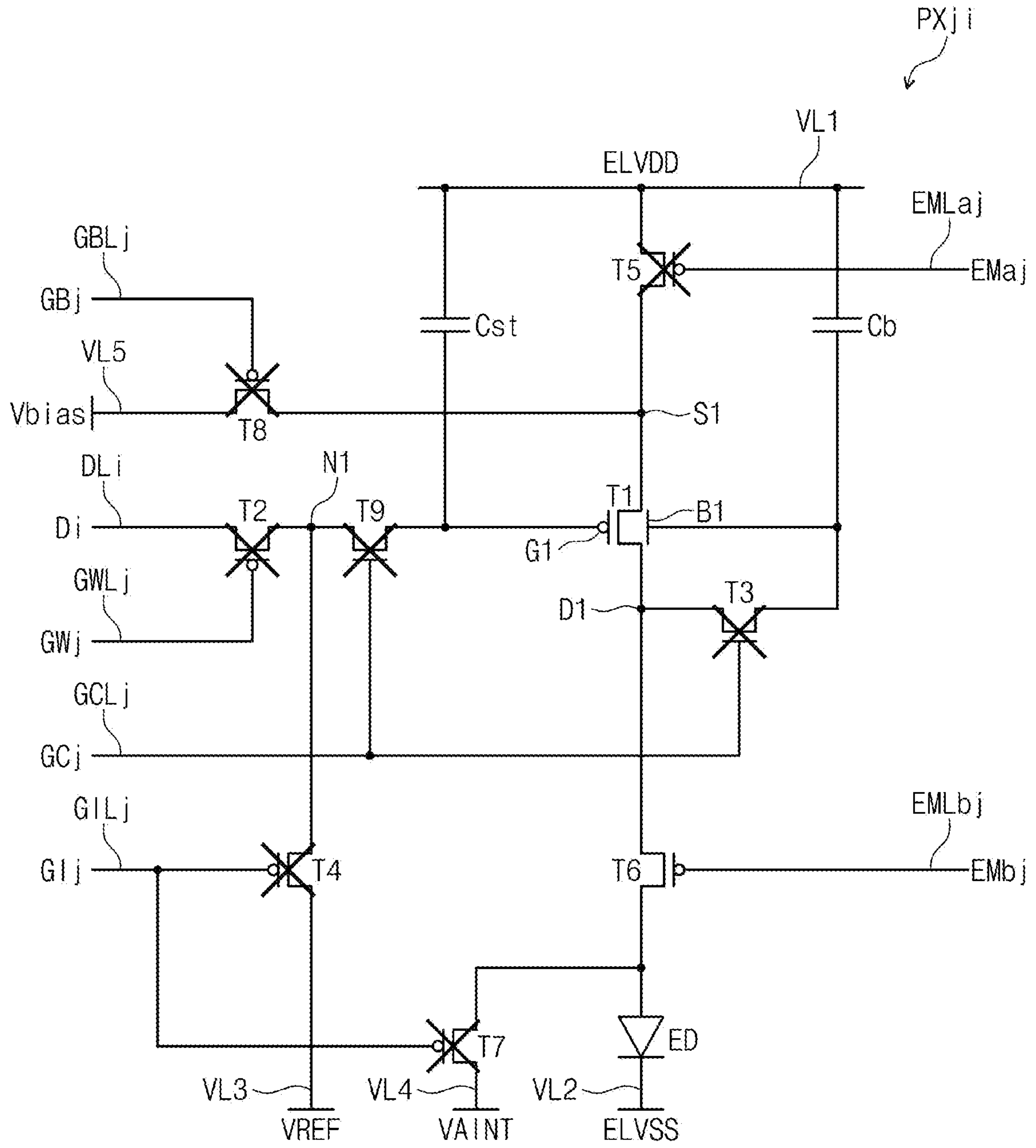
FIGS. 7A, 7B, 7C, 7D, 7E and 7F are diagrams for describing an operation of a pixel.

Referring to FIGS. 6 and 7A, during a non-emission period P1 in the frame F1, the emission control signal EMaj and the scan signals GIj, GCj, GBj, and GWj are at inactive levels, and the emission control signal EMbj is at an active level. Accordingly, only the sixth transistor T6 is turned on, and all of the second, third, fourth, fifth, seventh, eighth, and ninth transistors T2, T3, T4, T5, T7, T8, and T9 are turned off. A current is not supplied from the first voltage line VL1 to the light emitting element ED while the fifth transistor T5 is turned off, and thus the light emitting element ED is in a non-emission state.

Figure 7B:
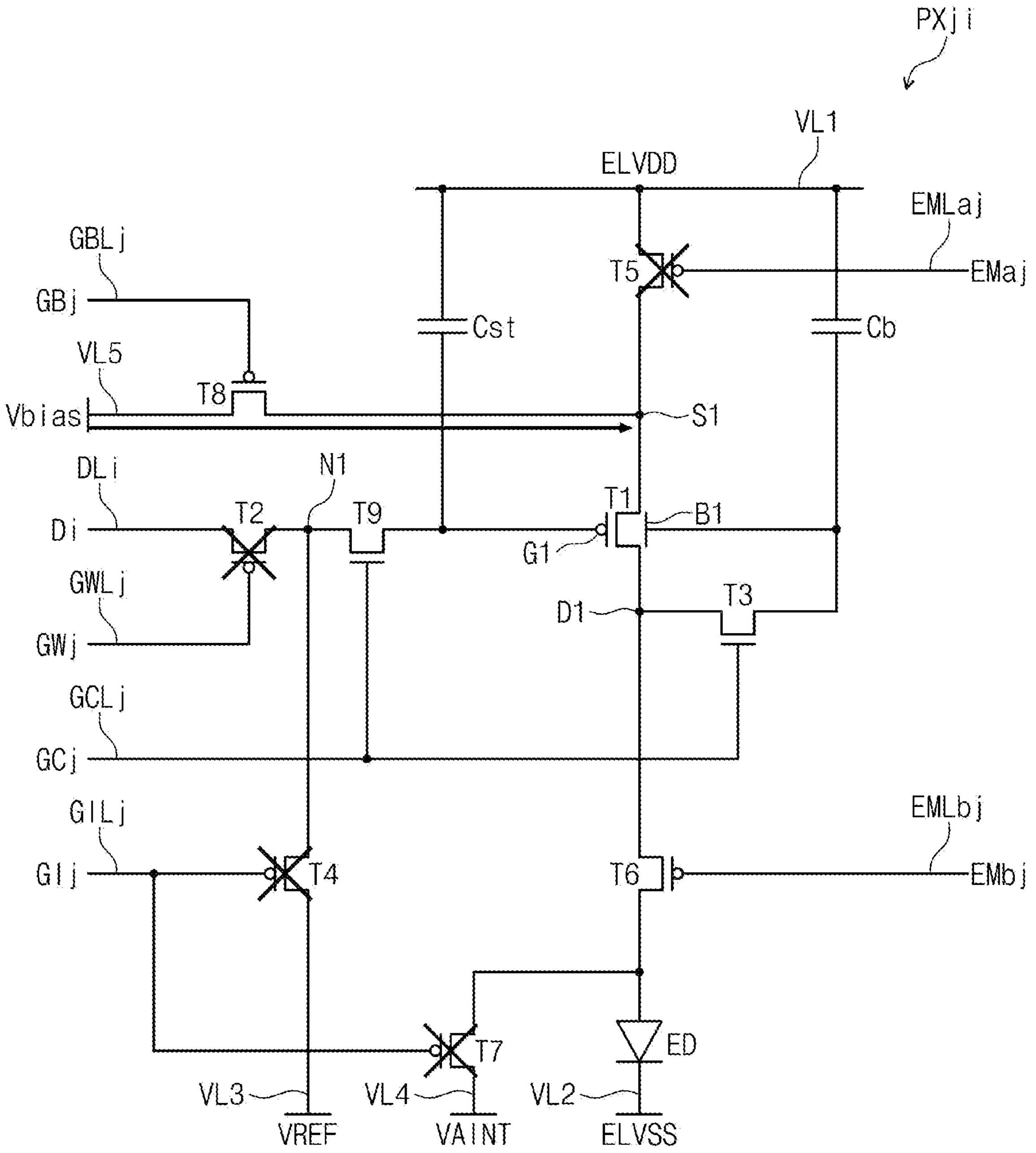

Referring to FIGS. 6 and 7B, when the scan signal GBj transitions to an active level during a bias period P2 in the frame F1, the eighth transistor T8 is turned on. The bias voltage Vbias may be delivered to the first electrode S1 of the first transistor T1 through the eighth transistor T8 that is turned on. The hysteresis characteristic of the first transistor T1 may be compensated by the bias voltage Vbias provided to the first electrode S1.

In addition, as the scan signal GCj transitions to a high level, which is an active level, during the bias period P2, the third transistor T3 and the ninth transistor T9 are turned on. In the bias period P2, the sixth transistor T6 may remain on.

Figure 7C:
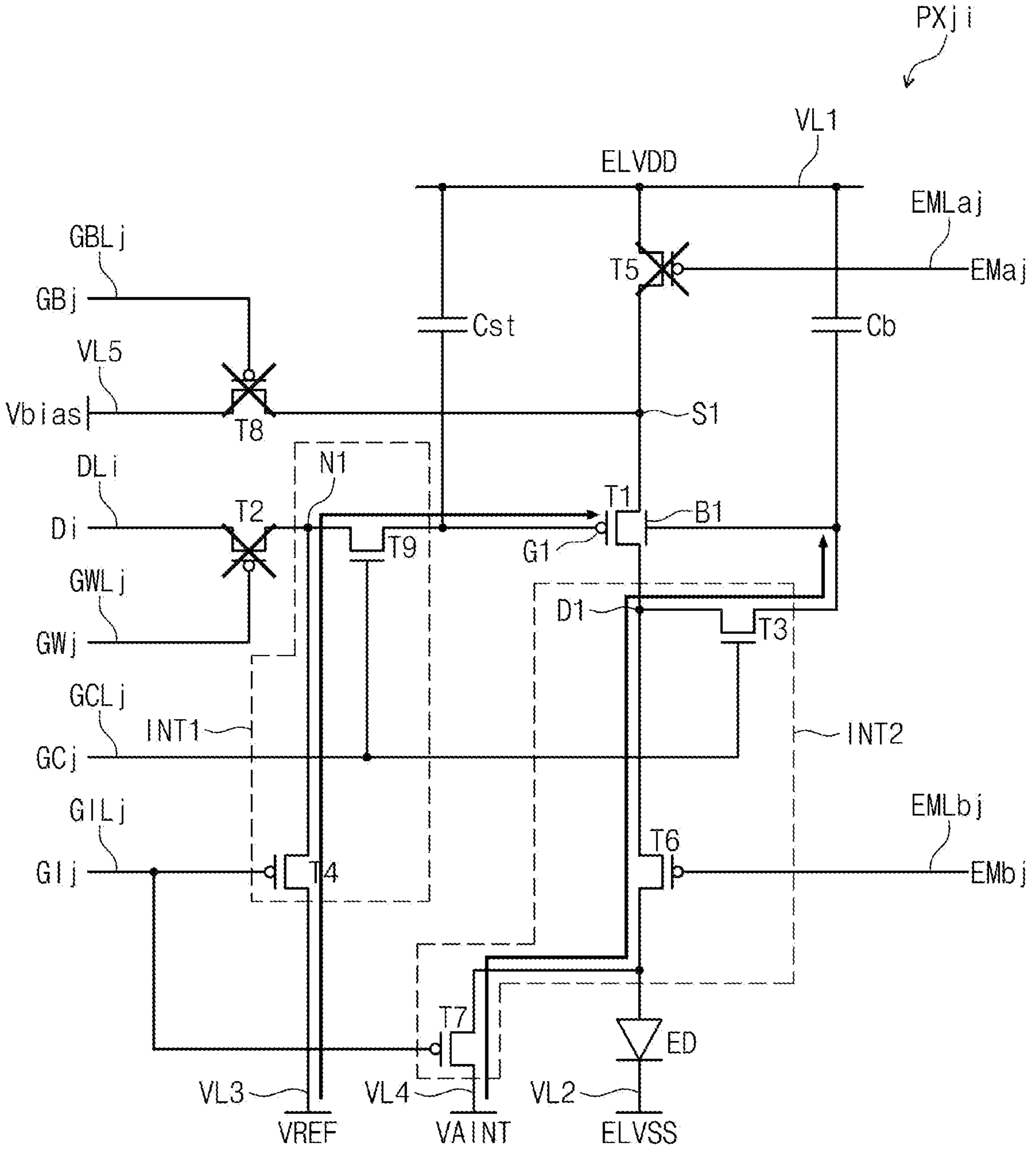

Referring to FIGS. 6 and 7C, during an initialization period P3 in the frame F1, the first circuit INT1 may deliver the reference voltage VREF to the gate electrode G1 of the first transistor T1 in response to the scan signals GIj and GCj. When the scan signal GIj transitions to the active level, the fourth transistor T4 in the first circuit INT1 is turned on and the seventh transistor T7 in the second circuit INT2 is turned on. The reference voltage VREF may be delivered to the gate electrode G1 of the first transistor T1 through the fourth transistor T4 and the ninth transistor T9 that are turned on. In other words, the gate electrode G1 of the first transistor T1 may be initialized to the reference voltage VREF.

In addition, the second circuit INT2 may deliver the initialization voltage VAINT to the body electrode B1 of the first transistor T1 in response to the scan signals GIj and GCj and the emission control signal EMbj. The initialization voltage VAINT may be delivered to the body electrode B1 of the first transistor T1 through the seventh transistor T7, the sixth transistor T6, and the third transistor T3 that are turned on in the second circuit INT2. In other words, the body electrode B1 of the first transistor T1 may be initialized to the initialization voltage VAINT. In addition, the anode of the light emitting element ED may be initialized to the initialization voltage VAINT.

Figure 7D:
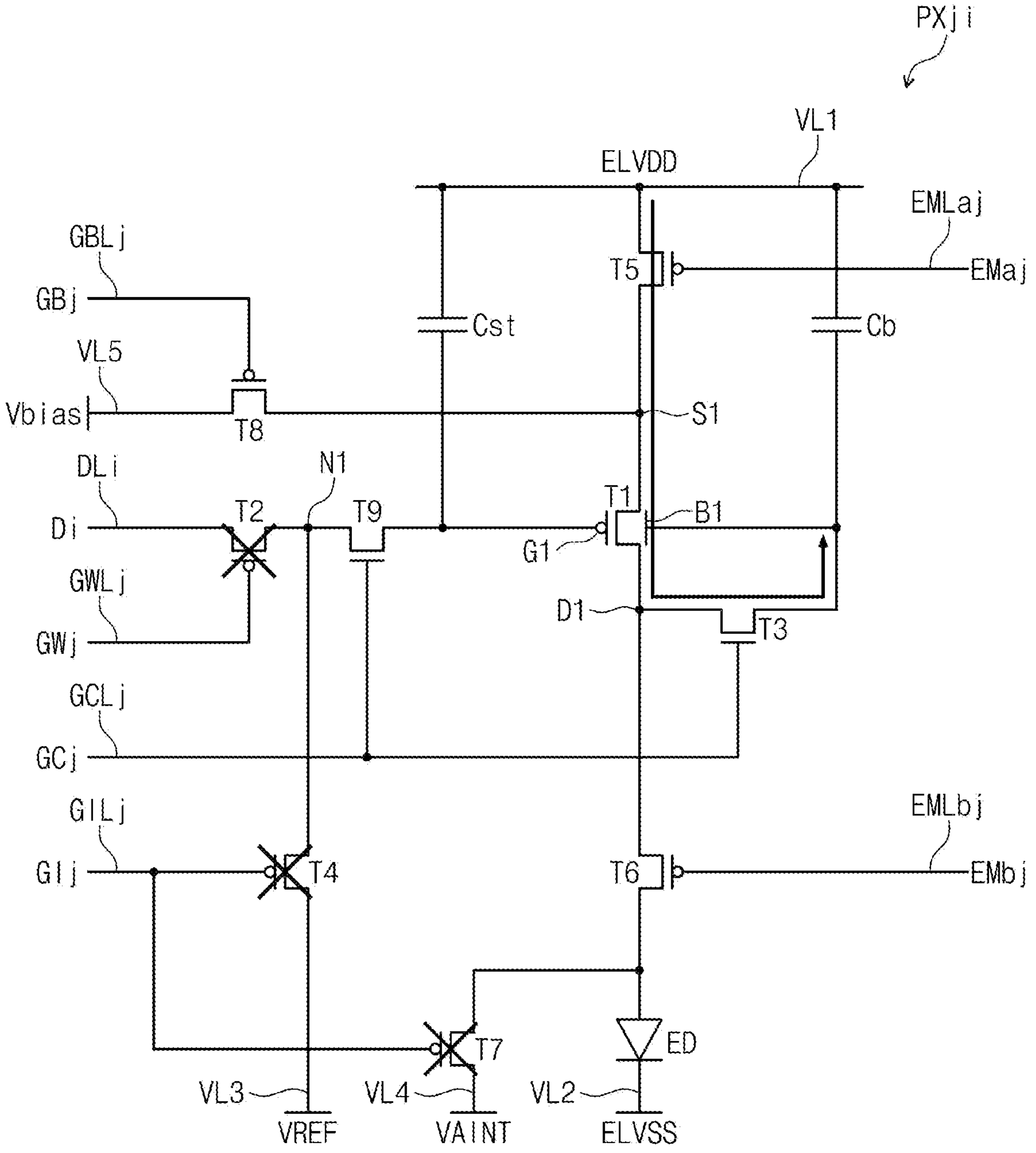

Referring to FIGS. 6 and 7D, when the emission control signal EMaj transitions to the active level in a threshold setting period P4 in the frame F1, the fifth transistor T5 is turned on. A current path may be formed between the first voltage line VL1 and the body electrode B1 of the first transistor T1 through the fifth transistor T5, the first transistor T1, and the third transistor T3 that are turned on.

Figure 8:
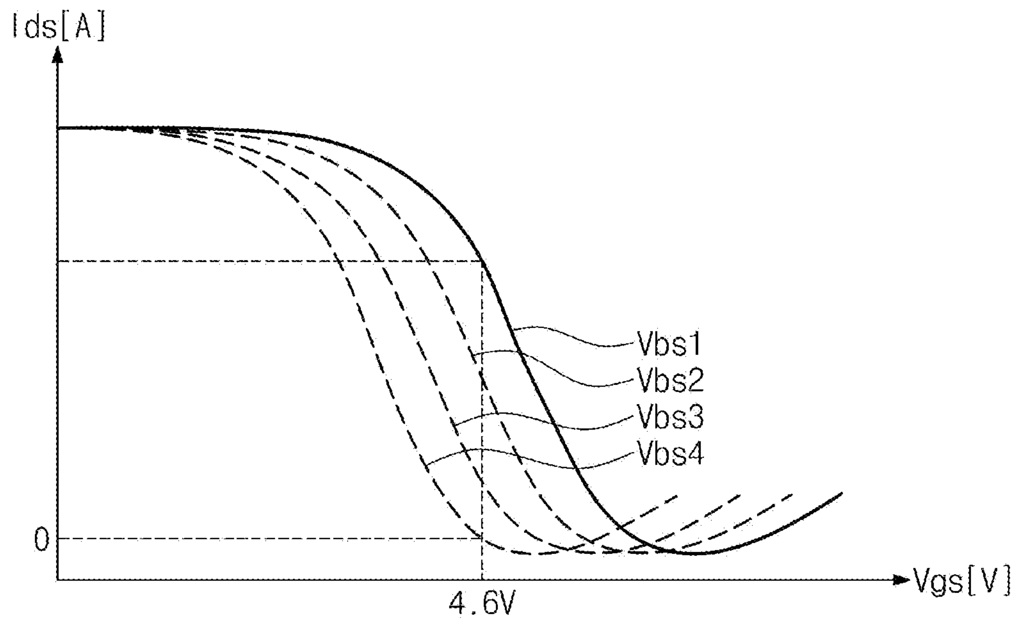
FIG. 8 is a diagram showing voltage-current characteristics of a first transistor.

FIG. 8 is a diagram showing voltage-current characteristics of the first transistor T1.

Referring to FIGS. 7D and 8, a threshold voltage (referred to as "Vth") of the first transistor T1 including the body electrode B1 may be changed depending on a body-source voltage (referred to as "Vbs") of the first transistor T1. For example, when the body-source voltage Vbs of the first transistor T1 increases, the threshold voltage Vth of the first transistor T1 increases, and thus, a current (referred to as "Ids") flowing through the first transistor T1 decreases.

In the example shown in FIG. 8, the body-source voltage Vbs of the first transistor T1 increases in the order of Vbs1, Vbs2, Vbs3 and Vbs4, and thus, the current Ids flowing through the first transistor T1 decreases.

The current Ids flowing through the first transistor T1 may be 0 when the following Equation 1 is satisfied.

$$Vs - Vg - Vth \leq 0 \quad \text{[Equation 1]}$$

In Equation 1, Vs is a voltage of the first electrode S1 of the first transistor T1; Vg is a voltage of the gate electrode G1 of the first transistor T1; and, Vth is a threshold voltage of the first transistor T1.

For example, when conditions of "Vs=ELVDD=4.6 V" and "Vg=VREF=0 V" are satisfied, Vth may be 4.6 V. In this case, the current Ids flowing through the first transistor T1 may be zero.

In other words, as the current flows through the first transistor T1 until the threshold voltage Vth of the first transistor T1 becomes 4.6 V, the body voltage Vb of the first transistor T1 increases until the threshold voltage Vth of the first transistor T1 becomes 4.6 V.

When the threshold voltage Vth becomes 4.6 V, no current flows through the first transistor T1. In other words, the voltage level of the body voltage Vb of the first transistor T1 may be determined based on the threshold voltage Vth according to the characteristic of the first transistor T1. Moreover, as the body voltage Vb of the first transistor T1 is determined, the threshold voltage Vth of the first transistor T1 may be changed to a predetermined level (e.g., 4.6 V).

The threshold voltage Vth of the first transistor T1 included in each of the plurality of pixels PX shown in FIG. 1 may be different from each other due to a process deviation in a production stage.

As described above, when the gate voltage Vg of the first transistor T1 is the reference voltage VREF (Vg=VREF), the threshold voltage Vth of the first transistor T1 included in each of the plurality of pixels PX may be changed by setting the body voltage Vb of the first transistor T1 to a voltage level (e.g., 4.6 V) at which a current Ids does not flow through the first transistor T1. In other words, the threshold voltage Vth of the plurality of pixels PX may be set to the same voltage level (e.g., 4.6 V).

The body voltage Vb of the first transistor T1 may be uniformly maintained by the second capacitor Cb.

Figure 7E:
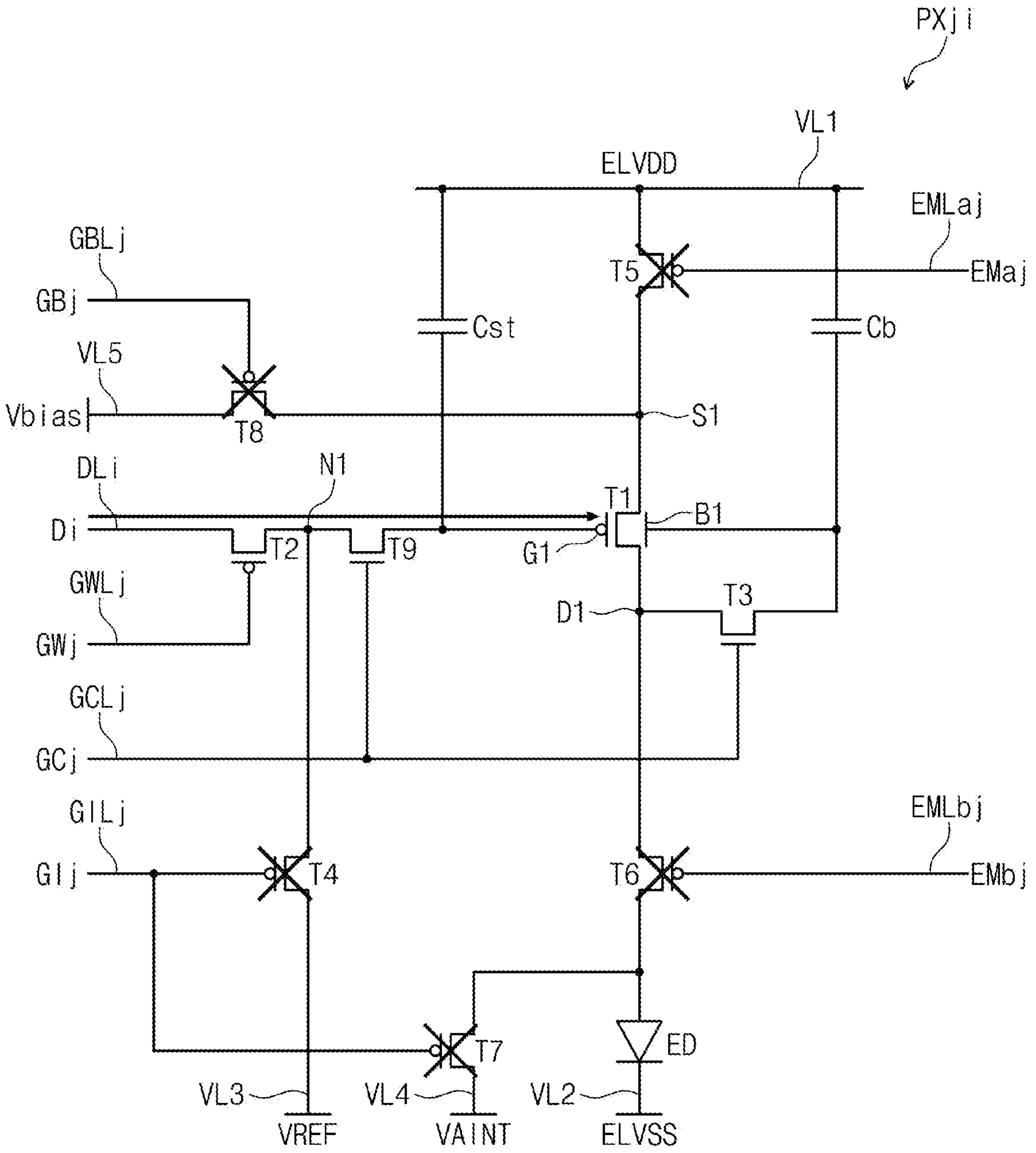

Referring to FIGS. 6 and 7E, when the scan signal GWj transitions to an active level in a data write period P5, the data signal Di may be delivered to the gate electrode G1 of the first transistor T1 through the second transistor T2 and the ninth transistor T9. Furthermore, the voltage level of the gate electrode G1 of the first transistor T1 may be constantly maintained by the first capacitor Cst.

Figure 7F:
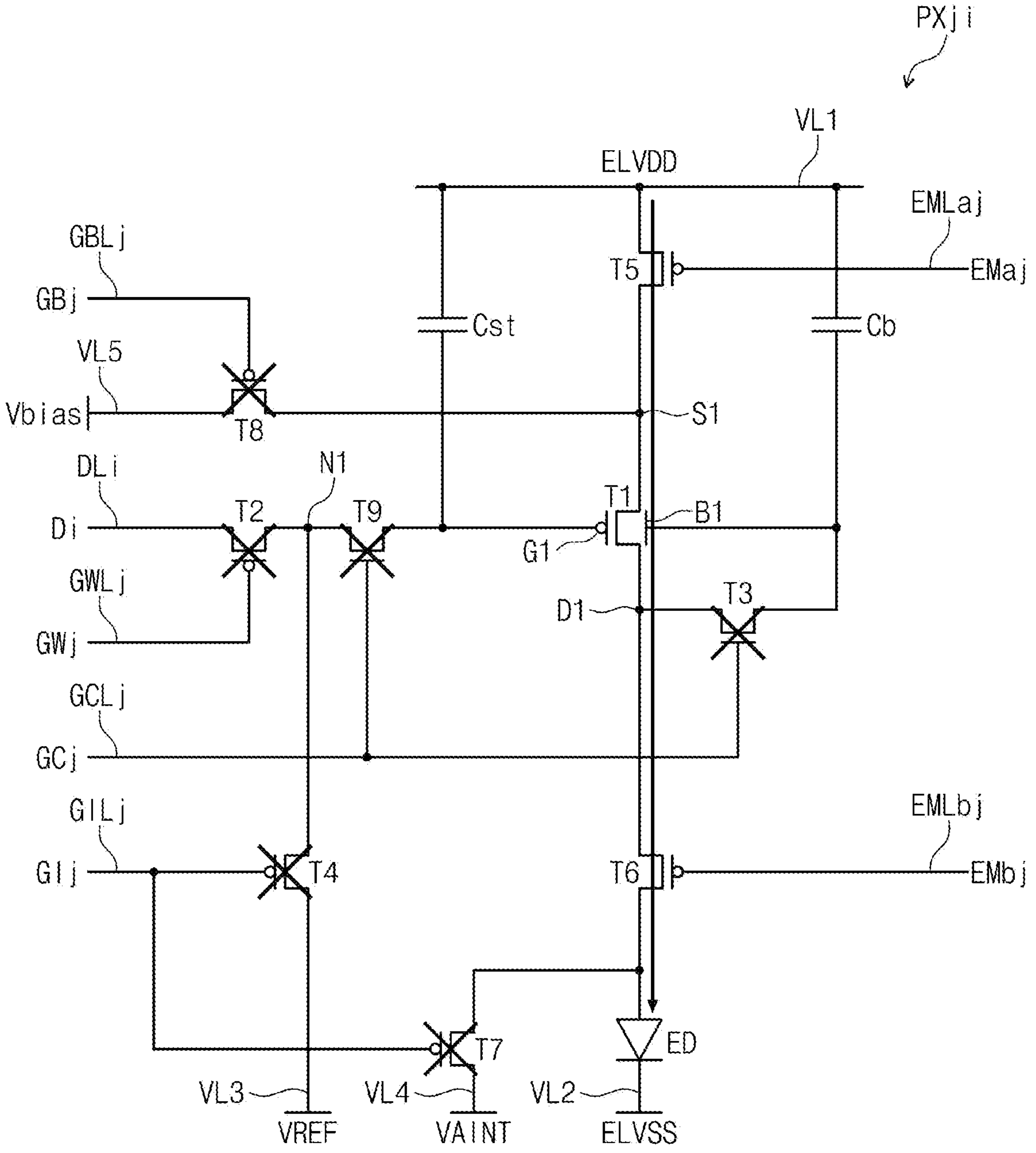

Referring to FIGS. 6 and 7F, all of the emission control signals EMaj and EMbj are at active levels during an emission period P6, and thus, a current path may be formed from the first voltage line VL1 to the light emitting element ED through the fifth transistor T5, the first transistor T1, and the sixth transistor T6.

Accordingly, a current Ids corresponding to a voltage (e.g., a voltage level of the data signal Di) of the gate electrode G1 of the first transistor T1 may be delivered to the light emitting element ED.

The current Ids delivered to the light emitting element ED is expressed by Equation 2 below.

$$Ids = K \times (Vgs - Vth) = K \times (ELVDD - Vdata - Vth) \quad \text{[Equation 2]}$$

In Equation 2, 'K' is a voltage-current proportional constant; Vgs is a voltage between the gate electrode G1 and the first electrode S1 of the first transistor T1; and, Vdata is a voltage of the data signal Di.

The current Ids delivered to the light emitting element ED depends on the threshold voltage Vth of the first transistor T1.

As previously described in FIG. 7D, the threshold voltage Vth of the first transistor T1 is changed to a predetermined level (e.g., 4.6 V) by setting the body voltage Vb of the first transistor T1. In other words, all of the pixels PX shown in FIG. 1 have the same threshold voltage Vth. Accordingly, a luminance deviation between the pixels PXji due to the deviation of the threshold voltage Vth of the first transistor T1 does not occur.

Figure 9:
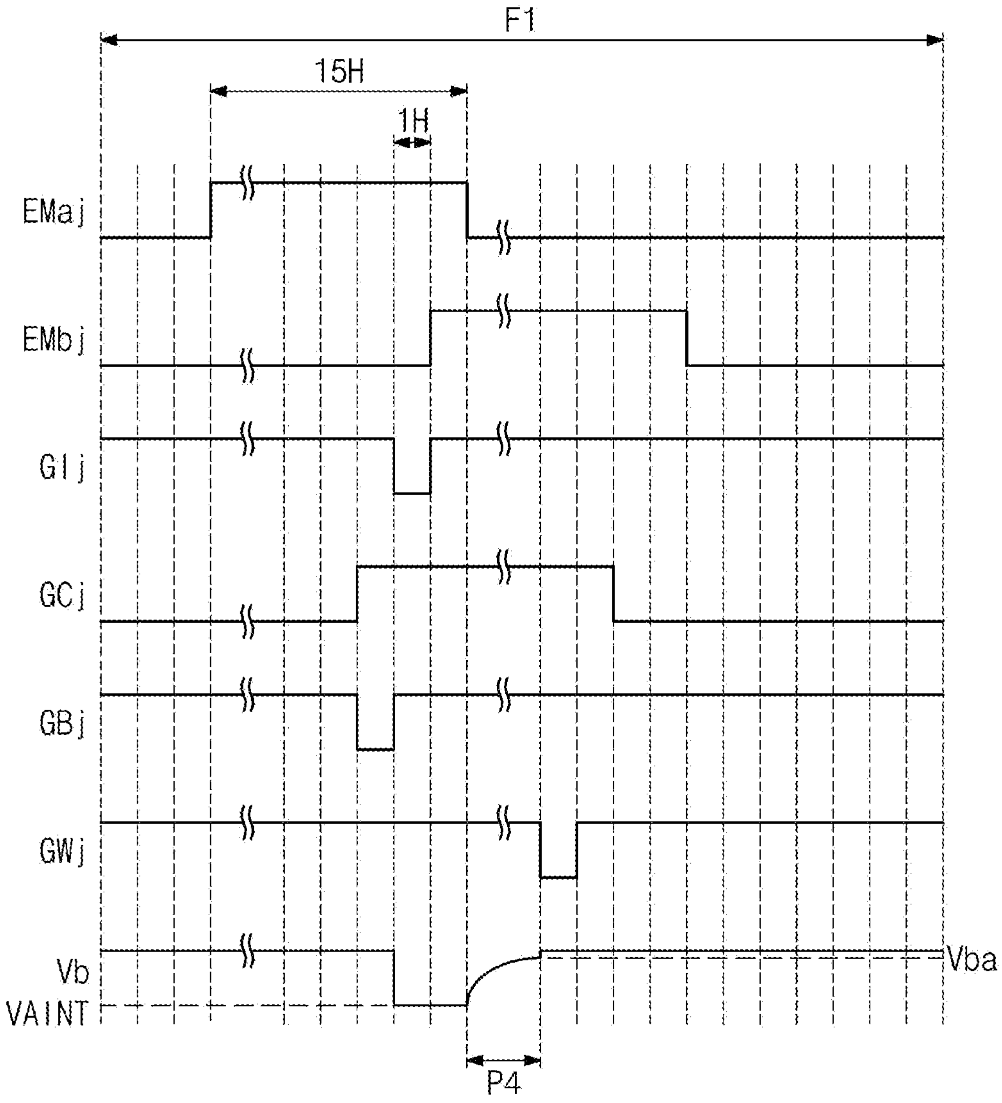
FIG. 9 shows a change in a body voltage of a first transistor in a threshold setting period.

FIG. 9 shows a change in the body voltage Vb of the first transistor T1 in the threshold setting period P4.

In the example shown in FIG. 9, a section in which each of the scan signals GIj, GBj, and GWj is maintained at an active level (e.g., a low level) may be one horizontal period (1H). A section in which each of the emission control signals EMaj and EMbj is maintained at an inactive level (e.g., a high level) may be 15 horizontal periods (15H). Moreover, a section in which the scan signal GCj is maintained at an active level (e.g., a high level) may be 15 horizontal periods (15H).

As described in FIG. 7C, when the scan signal GIj transitions from an inactive level (e.g., a high level) to the active level (e.g., a low level) while the scan signal GCj is at an active level (e.g., a high level) and the emission control signal EMbj is at the active level (e.g., a low level), the initialization voltage VAINT may be delivered to the body electrode B1 of the first transistor T1.

As described in FIG. 7D, when the emission control signal EMaj transitions to the active level during the threshold setting period P4, a current path is formed between the first voltage line VL1 and the body electrode B1 of the first transistor T1 through the fifth transistor T5, the first transistor T1 and the third transistor T3. The voltage Vb of the body electrode B1 of the first transistor T1 may increase while current is supplied. Because the threshold voltage Vth of the first transistor T1 becomes equal to the voltage Vgs between the gate electrode G1 and the first electrode S1 of the first transistor T1 (Vth=Vgs), the voltage Vb of the body electrode B1 of the first transistor T1 increases. When the voltage Vb of the body electrode B1 of the first transistor T1 is set to a predetermined voltage level Vba, the threshold voltage Vth of the first transistor T1 may be set to the same voltage level as the voltage Vgs between the gate electrode G1 and the first electrode S1 of the first transistor T1. In other words, the threshold voltage Vth of the first transistor T1 may be equal to a difference value (ELVDD−VREF) between the first driving voltage ELVDD and the reference voltage VREF.

In an embodiment, the threshold setting period P4 may be longer than one horizontal period (1H).

Figure 10:
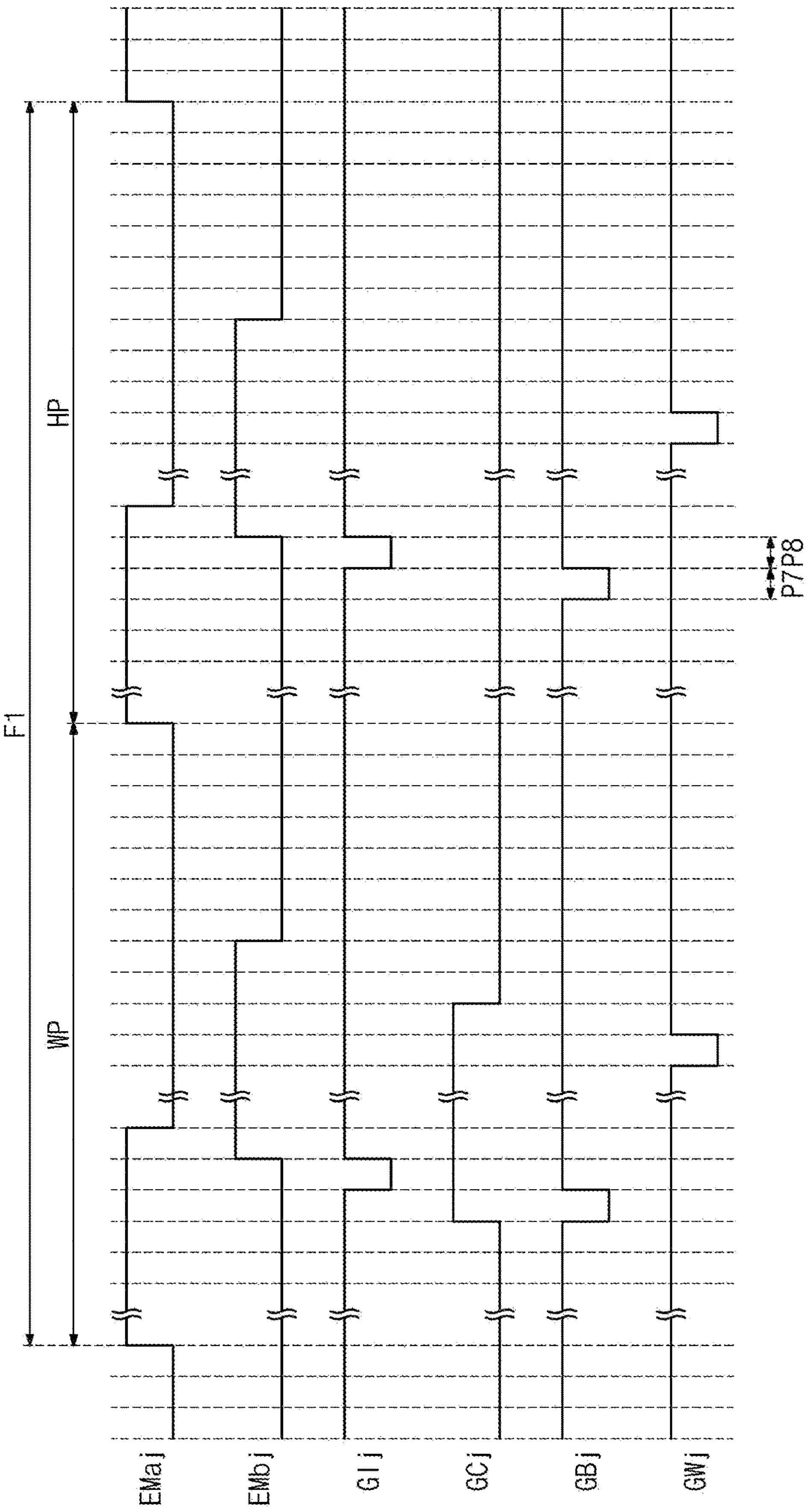
FIG. 10 is a timing diagram for describing an operation of a pixel illustrated in FIG. 2.

FIG. 10 is a timing diagram for describing an operation of the pixel PXji shown in FIG. 2.

In an embodiment, when the pixel PXji is driven at a first operating frequency (e.g., 240 Hz), the pixel PXji may operate depending on the timing diagram shown in FIG. 6.

In an embodiment, when the pixel PXji is driven at a second operating frequency (e.g., 120 Hz) lower than the first operating frequency, the pixel PXji may operate depending on the timing diagram shown in FIG. 10.

When the pixel PXji is driven at the first operating frequency (e.g., 240 Hz), as shown in FIG. 6, each of the frames F1 and F2 may include only a write section WP.

When the pixel PXji is driven at the second operating frequency (e.g., 120 Hz), as shown in FIG. 10, one the frame F1 may include the write section WP and a hold section HP.

During the write section WP shown in FIG. 10, the pixel PXji may operate in the same manner as the write section WP of the frame F1 shown in FIG. 6.

Figure 11A:
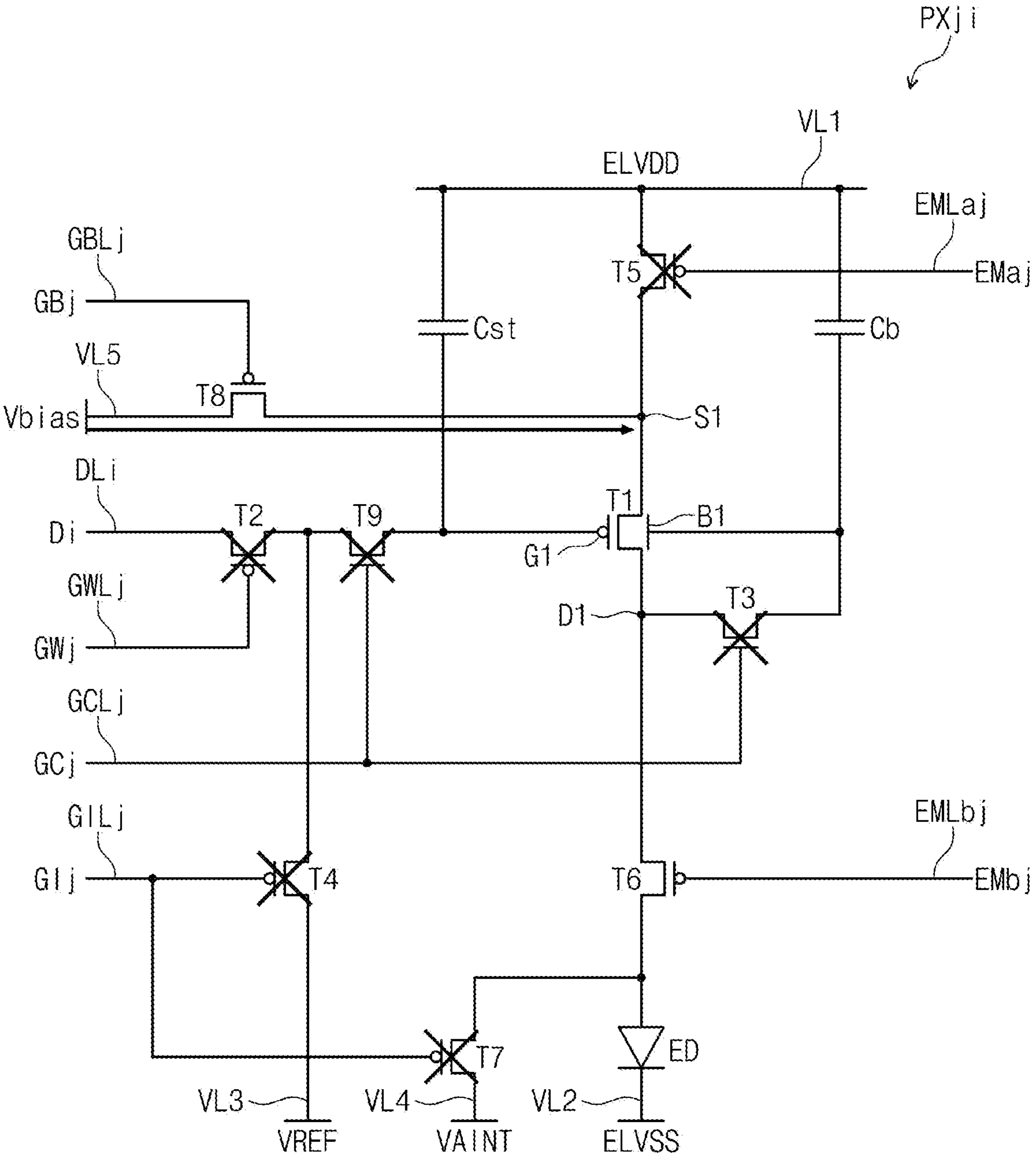
FIGS. 11A and 11B are diagrams for describing an operation of a pixel during a hold section.
Figure 11B:
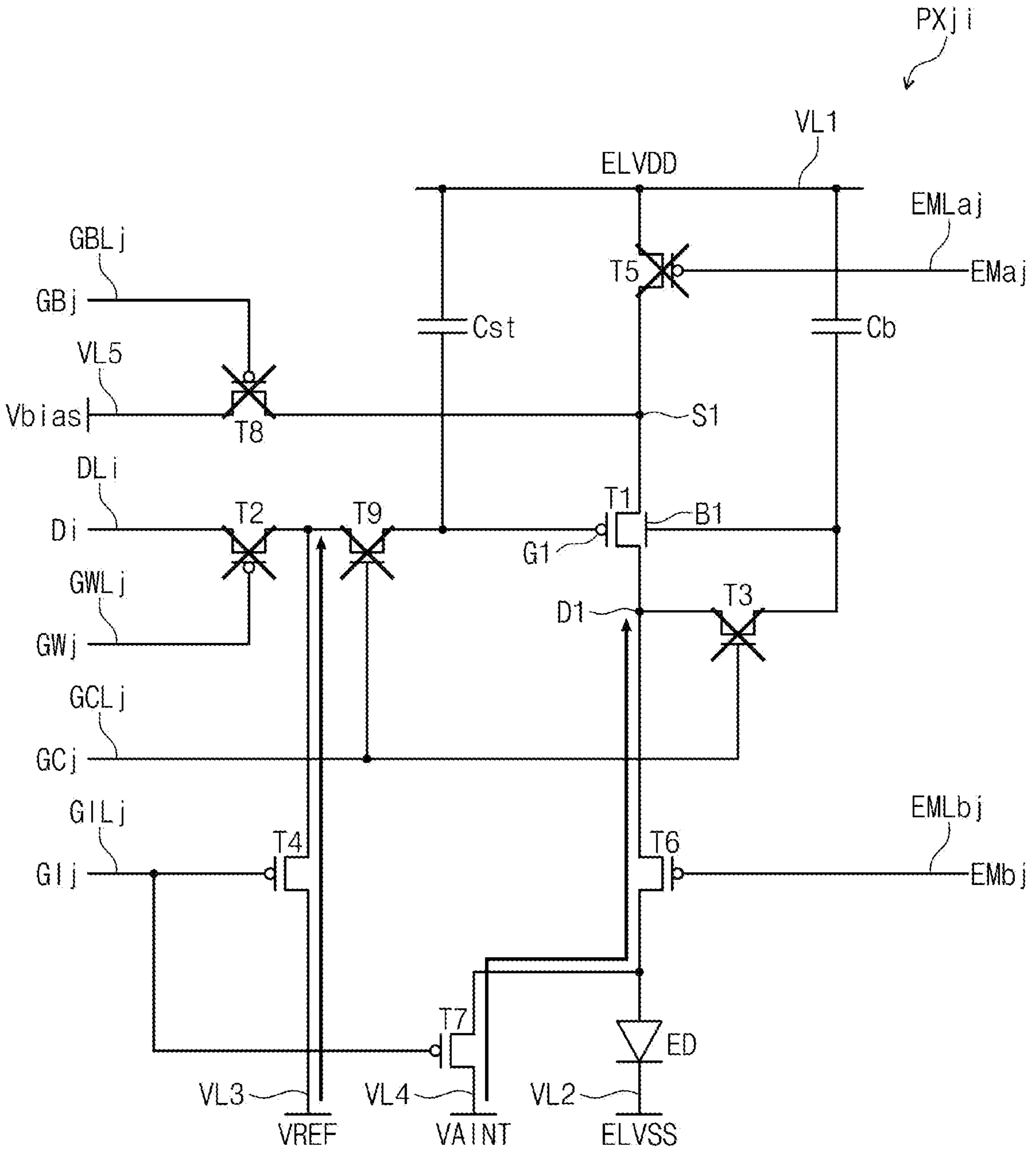

FIGS. 11A and 11B are diagrams for describing an operation of the pixel PXji during the hold section HP.

Referring to FIGS. 10 and 11A, during the hold section HP, the scan signal GCj is maintained at an inactive level (e.g., a low level). Accordingly, during the hold section HP, the data signal Di is not provided to the gate electrode G1 of the first transistor T1.

When the scan signal GBj transitions to an active level during a bias period P7 of the hold section HP, the eighth transistor T8 is turned on. The bias voltage Vbias may be delivered to the first electrode S1 of the first transistor T1 through the eighth transistor T8 that is turned on. The hysteresis characteristic of the first transistor T1 may be compensated by the bias voltage Vbias provided to the first electrode S1.

Referring to FIGS. 10 and 11B, when the scan signal GIj transitions to the active level in the initialization period P8 of the hold section HP, the fourth transistor T4 and the seventh transistor T7 are turned on. The reference voltage VREF may not be delivered to the gate electrode G1 of the first transistor T1 through the fourth transistor T4, since the ninth transistor T9 is not turned on.

Furthermore, the anode of the light emitting element ED may be initialized to the initialization voltage VAINT through the seventh transistor T7 that is turned on. The initialization voltage VAINT may not be delivered to the body electrode B1 of the first transistor T1, since the third transistor T3 is turned off.

Figure 12:
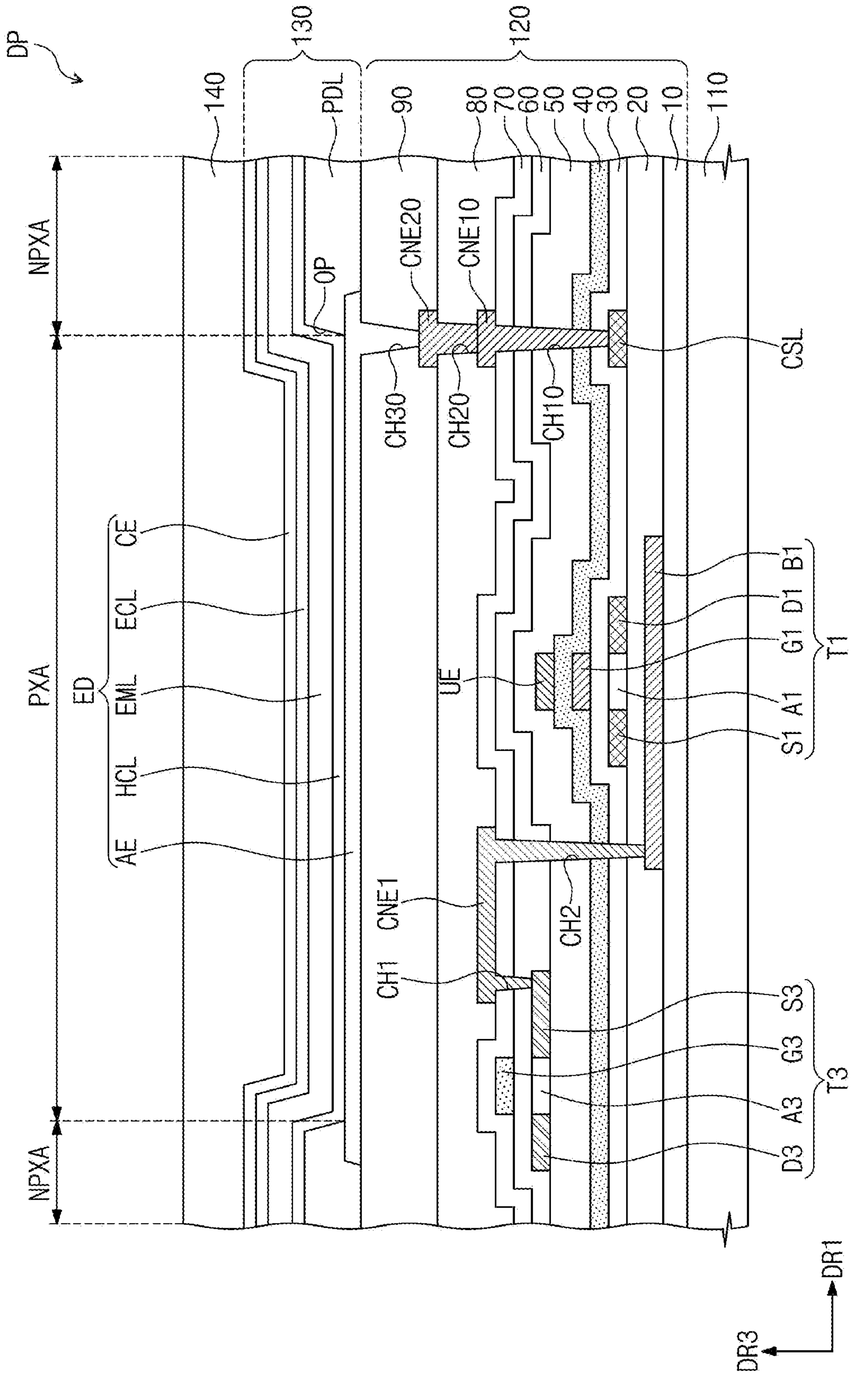
FIG. 12 is a cross-sectional view illustrating a pixel of a display panel, according to an embodiment of the present disclosure.

FIG. 12 is a cross-sectional view showing the pixel PXji of the display panel DP, according to an embodiment of the present disclosure.

Referring to FIG. 12, the display panel DP may include a substrate 110, a circuit layer 120 disposed on the substrate 110, an element layer 130, and an encapsulation layer 140.

The substrate 110 may be a member that provides a base surface on which the circuit layer 120 is disposed. The substrate 110 may be a rigid substrate or a flexible substrate capable of bending, folding, rolling, or the like. The substrate 110 may be a glass substrate, a metal substrate, a polymer substrate, or the like. However, an embodiment is not limited thereto, for example, the substrate 110 may be an inorganic layer, an organic layer, or a composite material layer.

The substrate 110 may have a multi-layer structure. For example, the substrate 110 may include a first synthetic resin layer, an intermediate layer in a multi-layer structure or a single-layer structure, and a second synthetic resin layer disposed on the intermediate layer. The intermediate layer may be referred to a base barrier layer. The intermediate layer may include, but is not specifically limited to, a silicon oxide (SiOx) layer and an amorphous silicon (a-Si) layer disposed on the silicon oxide layer. For example, the intermediate layer may include at least one of a silicon oxide layer, a silicon nitride layer, a silicon oxynitride layer, and an amorphous silicon layer.

Each of the first and second synthetic resin layers may include polyimide-based resin. In addition, each of the first and second synthetic resin layers may include at least one of acrylate-based resin, methacrylate-based resin, polyisoprene-based resin, vinyl-based resin, epoxy-based resin, urethane-based resin, cellulose-based resin, siloxane-based resin, polyamide-based resin, and perylene-based resin. In the specification, "-"-based resin means including the functional group of "-".

At least one inorganic layer is formed on an upper surface of the substrate 110. The inorganic layer may include at least one of aluminum oxide, titanium oxide, silicon oxide, silicon oxynitride, zirconium oxide, and hafnium oxide. The inorganic layer may be formed of multiple layers. The multiple inorganic layers may constitute a buffer layer 10, which will be described later.

The buffer layer 10 may be disposed on the substrate 110. The buffer layer 10 improves a bonding force between the substrate 110 and a semiconductor pattern and/or a conductive pattern. The buffer layer 10 may include a silicon oxide layer and a silicon nitride layer. The silicon oxide layer and the silicon nitride layer may be alternately stacked.

The body electrode B1 (or lower gate electrode) of the first transistor T1 is disposed on the buffer layer 10. The body electrode B1 may be in direct contact with the buffer layer 10. The body electrode B1 may be a part of a first conductive pattern.

A first insulating layer 20 may be disposed on the body electrode B1. The first insulating layer 20 may cover the body electrode B1.

A semiconductor pattern is placed on the first insulating layer 20. Hereinafter, the semiconductor pattern directly disposed on the first insulating layer 20 is referred to as a first semiconductor pattern. The first semiconductor pattern may include a silicon semiconductor. The first semiconductor pattern may include polysilicon. However, an embodiment is not limited thereto. For example, the first semiconductor pattern may include amorphous silicon.

FIG. 12 only illustrates a part of the first semiconductor pattern positioned on the first insulating layer 20. The first semiconductor pattern may be further disposed in another area of the pixel PXji (see FIG. 2). The first semiconductor pattern may be arranged across pixels in a specific rule. An electrical property of the first semiconductor pattern may vary depending on whether it is doped or not. The first semiconductor pattern may include a first area having high conductivity and a second area having low conductivity. The first area may be doped with an N-type dopant or a P-type dopant. A P-type transistor may include a doping area doped with the P-type dopant, and an N-type transistor may include a doping area doped with the N-type dopant. The second area may be an undoped area or an area doped with a concentration lower than a concentration in the first area.

A conductivity of the first area is greater than a conductivity of the second area. The first area may serve as an electrode or a signal line. The second area may correspond to an active area (or a channel) of a transistor. In other words, a part of the semiconductor pattern may be an active area of the transistor. Another part of the semiconductor pattern may be a source or drain of the transistor. Another part of the semiconductor pattern may be a connection electrode or a connection signal line.

As illustrated in FIG. 12, a first electrode S1, a channel part A1, and a second electrode D1 of the first transistor T1 are formed from the first semiconductor pattern. The first electrode S1 and the second electrode D1 of the first transistor T1 extend in opposite directions from the channel part A1.

A second insulating layer 30 may be disposed on the first insulating layer 20. The second insulating layer 30 may overlap a plurality of pixels in common and may cover the first semiconductor pattern. The second insulating layer 30 may be an inorganic layer and/or an organic layer, and may have a single-layer structure or a multi-layer structure. The second insulating layer 30 may include at least one of an aluminum oxide, a titanium oxide, a silicon oxide, a silicon nitride, a silicon oxynitride, a zirconium oxide, and a hafnium oxide. In an embodiment, the second insulating layer 30 may be a silicon oxide layer having a single layer structure. Not only the second insulating layer 30 but also an insulating layer of the circuit layer 120 to be described later may be an inorganic layer and/or an organic layer, and may have a single-layer structure or a multi-layer structure. The inorganic layer may include at least one of the above-described materials, but is not limited thereto.

A gate electrode G1 of the first transistor T1 is disposed on the second insulating layer 30. The gate electrode G1 may be part of a second conductive pattern. The gate electrode G1 of the first transistor T1 overlaps the channel part A1 of the first transistor T1. In a process of doping the first semiconductor pattern, the gate electrode G1 of the first transistor T1 may function as a mask.

A third insulating layer 40 may be disposed on the second insulating layer 30 and may cover the gate electrode G1 of the first transistor T1. The third insulating layer 40 may be an inorganic layer and/or an organic layer, and may have a single-layer structure or a multi-layer structure. The third insulating layer 40 may include at least one of silicon oxide, silicon nitride, and silicon oxynitride. In an embodiment, the third insulating layer 40 may have a multi-layer structure including a silicon oxide layer and a silicon nitride layer.

A fourth insulating layer 50 may be disposed on the third insulating layer 40. The fourth insulating layer 50 may have a single-layer or multi-layer structure. For example, the fourth insulating layer 50 may have a multi-layer structure including a silicon oxide layer and a silicon nitride layer. An upper electrode UE of the first capacitor Cst may be interposed between the third insulating layer 40 and the fourth insulating layer 50 The upper electrode UE of the first capacitor Cst may overlap the gate electrode G1 of the first transistor T1. Moreover, the lower electrode of the first capacitor Cst may be interposed between the second insulating layer 30 and the third insulating layer 40.

The second semiconductor pattern may be disposed on the fourth insulating layer 50. The second semiconductor pattern may include an oxide semiconductor. The oxide semiconductor may include a plurality of areas that are distinguished from one another depending on whether metal oxide is reduced. An area (hereinafter referred to as a "reduction area") in which the metal oxide is reduced has higher conductivity than an area (hereinafter referred to as a "non-reduction area") in which the metal oxide is not reduced. The reduction area actually serves as a source area/drain area of a transistor or a signal line. The non-reduction area actually corresponds to an active area (alternatively, a semiconductor area or a channel part) of a transistor. In other words, a part of the second semiconductor pattern may be the active area of a transistor; another part of the second semiconductor pattern may be the source/drain area of the transistor; and the other part of the second semiconductor pattern may be a signal transmission area.

As illustrated in FIG. 12, a first electrode S3, a channel portion A3, and a second electrode D3 of the third transistor T3 are formed from the second semiconductor pattern. The first electrode S3 and the second electrode D3 include a metal reduced from a metal oxide semiconductor. The first electrode S3 and the second electrode D3 may have a predetermined thickness from an upper surface of the second semiconductor pattern, and may include a metal layer including the reduced metal.

A fifth insulating layer 60 may be disposed on the fourth insulating layer 50. The fifth insulating layer 60 may overlap a plurality of pixels in common and may cover the second semiconductor pattern. The fifth insulating layer 60 may include at least one of an aluminum oxide, a titanium oxide, a silicon oxide, a silicon nitride, a silicon oxynitride, a zirconium oxide, and a hafnium oxide.

A gate electrode G3 of the third transistor T3 may be disposed on the fifth insulating layer 60. The gate electrode G3 may be a part of a fourth conductive pattern. The gate electrode G3 of the third transistor T3 overlaps the channel part A3 of the third transistor T3. In a process of doping the second semiconductor pattern, the gate electrode G3 of the third transistor T3 may function as a mask.

A sixth insulating layer 70 may be disposed on the fifth insulating layer 60 and may cover the gate electrode G3 of the third transistor T3. The sixth insulating layer 70 may be an inorganic layer and/or an organic layer, and may have a single-layer structure or a multi-layer structure. For example, the sixth insulating layer 70 may include a silicon oxide layer and a silicon nitride layer. The fifth insulating layer 60 may include a plurality of silicon oxide layers and a plurality of silicon nitride layers, which are alternately stacked.

The first electrode and the second electrode of the ninth transistor T9 (see FIG. 2) may be formed through the same process as the first electrode S3 and the second electrode D3 of the third transistor T3.

In an embodiment, a connection electrode CNE1 may be disposed on the sixth insulating layer 70. The connection electrode CNE1 is connected to the first electrode S3 of the third transistor T3 through a contact hole CH1 passing through the fifth and sixth insulating layers 60 and 70. Moreover, the connection electrode CNE1 is connected to the body electrode B1 of the first transistor T1 through a contact hole CH2 passing through the first to sixth insulating layers 20, 30, 40, 50, 60, and 70. This way, the body electrode B1 of the first transistor T1 and the first electrode S3 of the third transistor T3 may be connected to each other.

A first connection electrode CNE10 may be disposed on the sixth insulating layer 70. The first connection electrode CNE10 may be connected to a connection signal line CSL through a contact hole CH10 penetrating the second to sixth insulating layers 30, 40, 50, 60, and 70.

A seventh insulating layer 80 may be disposed on the sixth insulating layer 70. A second connection electrode CNE20 may be disposed on the seventh insulating layer 80. The second connection electrode CNE20 may be connected to the first connection electrode CNE10 through a contact hole CH20 penetrating the seventh insulating layer 80. An eighth insulating layer 90 may be disposed on the seventh insulating layer 80 and may cover the second connection electrode CNE20.

Each of the seventh insulating layer 80 and the eighth insulating layer 90 may be an organic layer. For example, each of the seventh insulating layer 80 and the eighth insulating layer 90 may include polymers such as Benzocyclobutene (BCB), polyimide, Hexamethyldisiloxane (HMDSO), Polymethylmethacrylate (PMMA) or Polystyrene (PS), a polymer derivative having a phenolic group, an acrylic polymer, an imide-based polymer, an acryl ether polymer, an amide-based polymer, a fluorine-based polymer, a p-xylene-based polymer, a vinyl alcohol-based polymer, and the blend thereof.

The element layer 130 includes the light emitting element ED and a pixel defining layer PDL. The light emitting element ED may include an anode AE, a hole control layer HCL, an light emitting layer EML, an electron control layer ECL, and a cathode CE.

The anode AE may be disposed on the eighth insulating layer 90. The anode AE may be connected to the second connection electrode CNE20 through a contact hole CH30 penetrating the eighth insulating layer 90. The anode AE may be a transmissive (e.g., semi-transmissive) electrode or a reflective electrode. According to an embodiment, the anode AE may include a reflective layer formed of Ag, Mg, Al, Pt, Pd, Au, Ni, Nd, Ir, Cr, or a compound thereof, and a transparent electrode or semi-transparent electrode layer formed on the reflective layer. The transparent or semi-transparent electrode layer may include at least one or more selected from a group including indium tin oxide (ITO), indium zinc oxide (IZO), indium gallium zinc oxide (IGZO), or indium oxide ($In_2O_3$), and aluminum-doped zinc oxide (AZO). For example, the anode AE may be provided with ITO/Ag/ITO.

The pixel defining layer PDL may be disposed on the eighth insulating layer 90. In an embodiment, the pixel defining layer PDL may have a property of absorbing light. For example, the pixel defining layer PDL may have a black color. The pixel defining layer PDL may include a black coloring agent. The black coloring agent may include a black dye and a black pigment. The black coloring agent may include carbon black, aniline black, a metal such as chromium, or an oxide thereof. The pixel defining layer PDL may be formed by mixing a blue organic material and a black organic material. The pixel defining layer PDL may further include a liquid-repellent organic material.

An opening OP of the pixel defining layer PDL exposes at least part of the anode AE of the light emitting element ED. The opening OP of the pixel defining layer PDL may define an emission area PXA. For example, the plurality of pixels PX (see FIG. 1) shown in FIG. 1 may be arranged on a plane of the display panel DP depending on a specific rule. An area in which the plurality of pixels PX are arranged may be referred to as a pixel area. One pixel area may include the emission area PXA and a non-emission area NPXA adjacent to the emission area PXA. The non-emission area NPXA may surround the emission area PXA.

The hole control layer HCL may be disposed in common in the emission area PXA and the non-emission area NPXA. A common layer such as the hole control layer HCL may be formed in common in the plurality of pixels PX. The hole control layer HCL may include a hole transport layer and a hole injection layer.

The light emitting layer EML is disposed on the hole control layer HCL. The light emitting layer EML may be commonly disposed on the plurality of pixels PX. In other words, the light emitting layer EML may be disposed in common in the emission area PXA and the non-emission area NPXA. For example, the light emitting layer EML may be formed in common throughout the emission area PXA and the non-emission area NPXA by an open mask. In this case, the light emitting layer EML may generate source light of white light or blue light. In addition, the light emitting layer EML may have a multi-layer structure.

In an embodiment of the present disclosure, the light emitting layer EML may be disposed only in an area corresponding to the opening OP. In this case, the plurality of light emitting layers EML may be provided, and the plurality of light emitting layers EML may be formed separately in each of the plurality of pixels PX. The plurality of light emitting layers EML may generate source light of white light or blue light. Alternatively, some of the light emitting layers EML may generate red light, others of the light emitting layers EML may generate green light, and further others of the light emitting layers EML may generate blue light. However, this is only an example. For example, some of the light emitting layers EML may generate mixed color light, for example, magenta light, yellow light, or cyan light.

The electron control layer ECL is disposed on the light emitting layer EML. The electron control layer ECL may include an electron transport layer and an electron injection layer. The cathode CE of the light emitting element ED is disposed on the electron control layer ECL. The electron control layer ECL and the cathode CE are disposed in common in the plurality of pixels PX.

The encapsulation layer 140 is disposed on the cathode CE. The encapsulation layer 140 may cover the plurality of pixels PX. In an embodiment, the encapsulation layer 140 directly covers the cathode CE. In an embodiment, the display panel DP may further include a capping layer directly covering the cathode CE. In an embodiment, the stacked structure of the light emitting element ED may have a vertically inverted structure in the structure shown in FIG. 12.

The encapsulation layer 140 includes at least one inorganic layer or at least one organic layer. In an embodiment, the encapsulation layer 140 may include two inorganic layers and an organic layer disposed therebetween. In an embodiment, a thin-film encapsulation layer may include a plurality of inorganic layers and a plurality of organic layers, which are alternately stacked.

An encapsulation inorganic layer protects the light emitting element ED from moisture or oxygen. An encapsulation organic layer protects the light emitting element ED from foreign objects such as dust particles. The encapsulation inorganic layer may include a silicon nitride layer, a silicon oxynitride layer, a silicon oxide layer, a titanium oxide layer, an aluminum oxide layer, or the like, but is not specifically limited thereto. The encapsulation organic layer may include an acryl-based organic layer, and is not specifically limited thereto.

Figure 13:
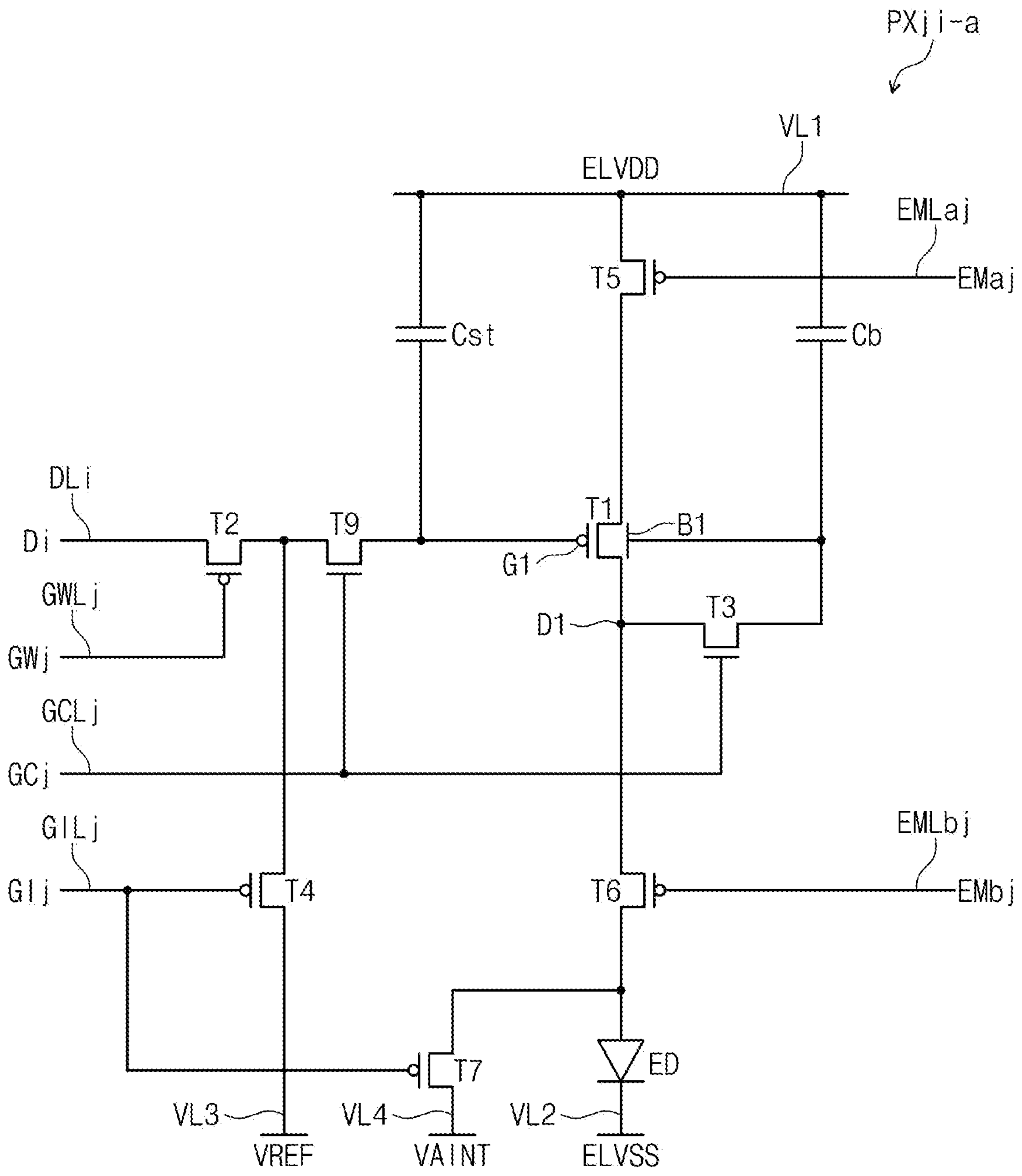
FIG. 13 is a circuit diagram of a pixel, according to an embodiment of the present disclosure.

FIG. 13 is a circuit diagram of a pixel, according to an embodiment of the present disclosure.

FIG. 13 illustrates a circuit diagram of a pixel PXji-a connected to the i-th data line DLi, the j-th scan lines GILj, GWLj, and GCLj and the j-th emission control lines EMLaj and EMLbj, which are illustrated in FIG. 1. The pixel PXji-a shown in FIG. 13 includes a circuit configuration similar to that of the pixel PXji shown in FIG. 2, and thus additional descriptions will be omitted to avoid redundancy.

The pixel PXji-a shown in FIG. 13 includes a circuit configuration similar to that of the pixel PXji shown in FIG. 2, but does not include the eighth transistor T8. Accordingly, the pixel PXji-a does not receive the scan signal GBj.

As described in FIGS. 7B and 11A, the eighth transistor T8 delivers the bias voltage Vbias to the first electrode S1 of the first transistor T1. When it is not necessary to initialize the first electrode S1 of the first transistor T1 to the bias voltage Vbias, the pixel PXji-a may not include the eighth transistor T8.

Figure 14:
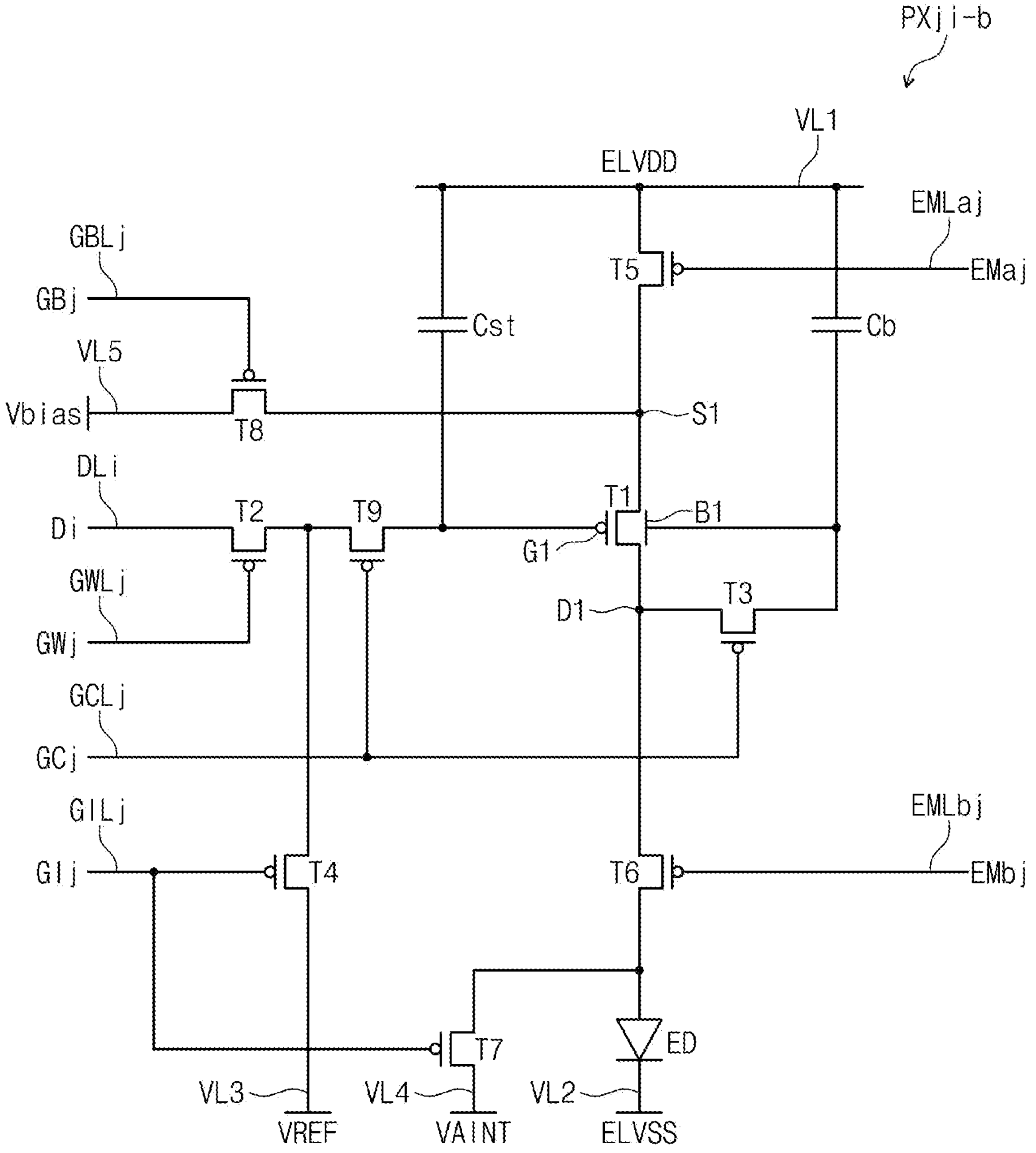
FIG. 14 is a circuit diagram of a pixel, according to an embodiment of the present disclosure.

FIG. 14 is a circuit diagram of a pixel, according to an embodiment of the present disclosure.

FIG. 14 illustrates a circuit diagram of a pixel PXji-b connected to the i-th data line DLi, the j-th scan lines GILj, GBLj, GWLj, and GCLj and the j-th emission control lines EMLaj and EMLbj, which are illustrated in FIG. 1. The pixel PXji-b shown in FIG. 14 includes a circuit configuration similar to that of the pixel PXji shown in FIG. 2, and thus additional descriptions will be omitted to avoid redundancy.

The pixel PXji-b shown in FIG. 14 includes a circuit configuration similar to that of the pixel PXji shown in FIG. 2, and thus the third transistor T3 and the ninth transistor T9 are P-type transistors. In other words, the pixel PXji-b shown in FIG. 14 includes the first to ninth transistors T1, T2, T3, T4, T5, T6, T7, T8, and T9, and all of the first to ninth transistors T1, T2, T3, T4, T5, T6, T7, T8, and T9 are P-type transistors.

Figure 15:
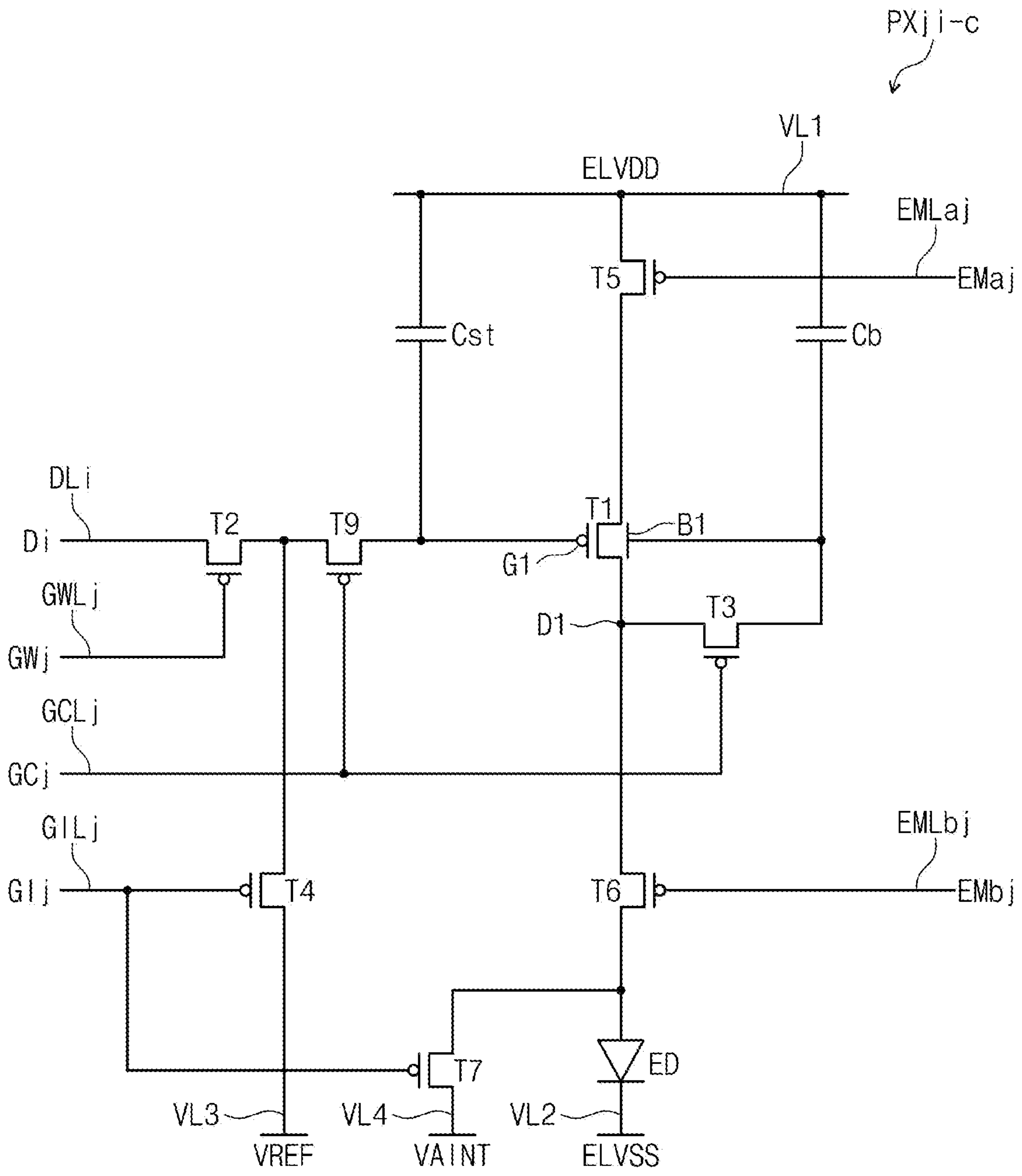
FIG. 15 is a circuit diagram of a pixel, according to an embodiment of the present disclosure.

FIG. 15 is a circuit diagram of a pixel, according to an embodiment of the present disclosure.

FIG. 15 illustrates a circuit diagram of a pixel PXji-c connected to the i-th data line DLi, the j-th scan lines GILj, GWLj, and GCLj and the j-th emission control lines EMLaj and EMLbj, which are illustrated in FIG. 1. The pixel PXji-c shown in FIG. 15 includes a circuit configuration similar to that of the pixel PXji shown in FIG. 2, and thus additional descriptions will be omitted to avoid redundancy.

The pixel PXji-c shown in FIG. 15 includes a circuit configuration similar to that of the pixel PXji shown in FIG. 2, but does not include the eighth transistor T8. Accordingly, the pixel PXji-c does not receive the scan signal GBj.

Moreover, all of the first to seventh transistors T1, T2, T3, T4, T5, T6, and T7 and the ninth transistor T9 are P-type transistors.

Although embodiments of the present disclosure have been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification.

A pixel of a display device having such a configuration as described herein may directly deliver a data signal to a gate electrode of a first transistor without passing through a capacitor, and thus the pixel of the display device may maintain a voltage level of the data signal to be low. Accordingly, the power consumption of the display device may be reduced.

Moreover, a leakage current may be minimized by configuring some transistors in the pixel as N-type transistors. As a result, the pixel may operate at a low operating frequency.

Furthermore, the pixel may operate at a high operating frequency by temporally separating a threshold setting period to compensate for a threshold voltage of the first transistor and a data write period.

According to a threshold compensation method of the present disclosure, all pixels may have a threshold voltage. Accordingly, there is no luminance deviation between pixels due to a threshold voltage deviation of the first transistor.

The pixel also includes an eighth transistor that provides a bias voltage to a first electrode of the first transistor, thereby minimizing a change in luminance due to a fluctuation in the operating frequency.

A scan driving circuit that provides scan signals to the pixel may output a plurality of scan signals in common. Accordingly, a circuit area of the scan driving circuit may be minimized.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A pixel, comprising:

a light emitting element;

a first transistor including a first electrode, a second electrode electrically connected to the light emitting element, a gate electrode, and a body electrode;

a second transistor connected between a first driving voltage line for receiving a first driving voltage and the first electrode of the first transistor and including a gate electrode for receiving a first emission control signal;

a first circuit which provides a reference voltage to the gate electrode of the first transistor in response to a first scan signal and a second scan signal; and a second circuit which provides an initialization voltage to the body electrode of the first transistor in response to the first scan signal, the second scan signal, and a second emission control signal, wherein the first circuit includes:

a third transistor connected between a first node and a second driving voltage line for receiving the reference voltage and including a gate electrode for receiving the first scan signal; and a fourth transistor connected between the first node and the gate electrode of the first transistor and including a gate electrode for receiving the second scan signal, the pixel further comprising a fifth transistor connected between a data line for receiving a data signal and the first node and including a gate electrode for receiving a third scan signal, wherein the data signal is delivered to the gate electrode of the first transistor by passing through the fifth transistor, the first node and the fourth transistor, and wherein the first node is located between the fifth transistor and the fourth transistor, wherein, during a first period, the third transistor and the fourth transistor are turned on in response to the first scan signal and the second scan signal, and the fifth transistor is turned off in response to the third scan signal.

2. The pixel of claim 1, wherein each of the first transistor, the second transistor, the third transistor, and the fifth transistor is a P-type transistor, and the fourth transistor is an N-type transistor.

3. The pixel of claim 1, further comprising:

a ninth transistor connected between a fourth driving voltage line for receiving a bias voltage and the first electrode of the first transistor and including a gate electrode for receiving a fourth scan signal.

4. The pixel of claim 1, further comprising:

a first capacitor connected between the first driving voltage line and the gate electrode of the first transistor; and a second capacitor connected between the first driving voltage line and the body electrode of the first transistor.

5. The pixel of claim 1, wherein the second circuit includes:

a sixth transistor connected between an anode of the light emitting element and a third driving voltage line for receiving the initialization voltage and a gate electrode for receiving the first scan signal;

a seventh transistor connected between the second electrode of the first transistor and the anode of the light emitting element and including a gate electrode for receiving the second emission control signal; and an eighth transistor connected between the second electrode of the first transistor and the body electrode of the first transistor and including a gate electrode for receiving the second scan signal.

6. The pixel of claim 5, wherein, during the first period, the reference voltage is provided to the gate electrode of the first transistor by the first circuit, and the initialization voltage is provided to the body electrode of the first transistor by the second circuit, and wherein, during a second period, the first driving voltage is provided to the first electrode of the first transistor by the second transistor.

7. The pixel of claim 6, wherein each of the first transistor, the second transistor, the sixth transistor, and the seventh transistor is a P-type transistor, and the eighth transistor is an N-type transistor.

8. The pixel of claim 6, wherein, during the second period, a voltage level of the body electrode of the first transistor increases from the initialization voltage until a threshold voltage of the first transistor reaches a difference between the first driving voltage and the reference voltage.

9. The pixel of claim 8, wherein, during the second period, each of the first emission control signal and the second scan signal is at an active level.

10. A display device, comprising:

a pixel connected to a first scan line, a second scan line, a first emission control line, and a second emission control line;

a driving circuit which outputs a first scan signal, a second scan signal, a first emission control signal, and a second emission control signal, which are used to drive the pixel, to the first scan line, the second scan line, the first emission control line, and the second emission control line, respectively; and a driving controller which controls the driving circuit, wherein the pixel includes:

a light emitting element;

a first transistor including a first electrode, a second electrode electrically connected to the light emitting element, a gate electrode, and a body electrode;

a second transistor connected between a first driving voltage line for receiving a first driving voltage and the first electrode of the first transistor and including a gate electrode for receiving the first emission control signal;

a first circuit which provides a reference voltage to the gate electrode of the first transistor in response to the first scan signal and the second scan signal; and a second circuit which provides an initialization voltage to the body electrode of the first transistor in response to the first scan signal, the second scan signal, and the second emission control signal, wherein the first circuit includes:

a third transistor connected between a first node and a second driving voltage line for receiving the reference voltage and including a gate electrode for receiving the first scan signal; and a fourth transistor connected between the first node and the gate electrode of the first transistor and including a gate electrode for receiving the second scan signal, the pixel further comprising a fifth transistor connected between a data line for receiving a data signal and the first node and including a gate electrode for receiving a third scan signal, wherein the data signal is delivered to the gate electrode of the first transistor by passing through the fifth transistor, the first node and the fourth transistor, and wherein the first node is located between the fifth transistor and the fourth transistor, wherein, during a first period, the third transistor and the fourth transistor are turned on in response to the first scan signal and the second scan signal, and the fifth transistor is turned off in response to the third scan signal.

11. The display device of claim 10, wherein the second circuit includes:

a sixth transistor connected between an anode of the light emitting element and a third driving voltage line for receiving the initialization voltage and a gate electrode for receiving the first scan signal;

a seventh transistor connected between the second electrode of the first transistor and the anode of the light emitting element and including a gate electrode for receiving the second emission control signal; and an eighth transistor connected between the second electrode of the first transistor and the body electrode of the first transistor and including a gate electrode for receiving the second scan signal.

12. The display device of claim 11, wherein, during a first period, the reference voltage is provided to the gate electrode of the first transistor by the first circuit, and the initialization voltage is provided to the body electrode of the first transistor by the second circuit, and wherein, during a second period, the first driving voltage is provided to the first electrode of the first transistor by the second transistor.

13. The display device of claim 12, further comprising:

a ninth transistor connected between a fourth driving voltage line for receiving a bias voltage and the first electrode of the first transistor and including a gate electrode for receiving a fourth scan signal.

14. The display device of claim 13, wherein the driving circuit includes:

an emission driving circuit which outputs the first emission control signal and the second emission control signal;

a first scan driving circuit which outputs the second scan signal; and a second scan driving circuit which outputs the first scan signal, the third scan signal, and the fourth scan signal, wherein the first scan signal, the third scan signal, and the fourth scan signal are signals having the same pulse widths as one another and different phases from one another.

15. An operating method of a pixel, the pixel including a first transistor including a first electrode, a second electrode electrically connected to a light emitting element, a gate electrode, and a body electrode, and a second transistor connected between the second electrode of the first transistor and the body electrode, the method comprising:

providing a reference voltage to the gate electrode of the first transistor, wherein the reference voltage is provided to the gate electrode of the first transistor via a third transistor and a fourth transistor of the pixel;

providing an initialization voltage to the body electrode of the first transistor;

providing a first driving voltage to the first electrode of the first transistor, wherein the first driving voltage provided to the first electrode of the first transistor is delivered to the body electrode of the first transistor by passing through the first electrode of the first transistor, the second electrode of the first transistor and then the second transistor; and providing a data signal to the gate electrode of the first transistor via the fourth transistor and a fifth transistor of the pixel, wherein the data signal passes through a node directly connected to each of the third, fourth and fifth transistors, wherein, during a first period, the third transistor and the fourth transistor are turned on in response to a first scan signal and a second scan signal, and the fifth transistor is turned off in response to a third scan signal.

16. The method of claim 15, wherein a voltage level of the body electrode of the first transistor increases from the initialization voltage until a threshold voltage of the first transistor reaches a difference between the first driving voltage and the reference voltage.

17. A pixel, comprising:

a light emitting element;

a first transistor including a first electrode, a second electrode, a gate electrode and a body electrode;

a second transistor connected between the first transistor and a driving voltage line;

a first circuit including third and fourth transistors, the third transistor connected to a first electrode of the fourth transistor, the third transistor being turned on in response to a first scan signal, the fourth transistor being turned on in response to a second scan signal, the first circuit providing a reference voltage to the gate electrode of the first transistor when the third and fourth transistors are turned on; and a second circuit including fifth, sixth and seventh transistors, the fifth transistor being turned on in response to the first scan signal, the sixth transistor being turned on in response to an emission control signal and the seventh transistor being turned on in response to the second scan signal, the second circuit providing an initialization voltage to the body electrode of the first transistor when the fifth, sixth and seventh transistors are turned on, the pixel further comprising an eighth transistor connected between a data line for receiving a data signal and a first node, and the data signal is delivered to the gate electrode of the first transistor by passing through the eighth transistor, the first node and the fourth transistor, wherein the first node is located between the eighth transistor and the fourth transistor, wherein, during a first period, the third transistor and the fourth transistor are turned on in response to the first scan signal and the second scan signal, and the eighth transistor is turned off in response to a third scan signal.

18. The pixel of claim 17, wherein the fourth and seventh transistors are different type transistors than the first, second, third, fifth and sixth transistors.

* * * * *